United States Patent
Ito et al.

(10) Patent No.: US 8,259,541 B2
(45) Date of Patent: Sep. 4, 2012

(54) OPTICAL RECORDING/REPRODUCTION METHOD, OPTICAL RECORDING/REPRODUCTION DEVICE, PROGRAM, AND OPTICAL RECORDING MEDIUM

(75) Inventors: Eiichi Ito, Niigata (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 107 days.

(21) Appl. No.: 12/922,954

(22) PCT Filed: Feb. 24, 2009

(86) PCT No.: PCT/JP2009/000808
§ 371 (c)(1),
(2), (4) Date: Sep. 16, 2010

(87) PCT Pub. No.: WO2009/116229
PCT Pub. Date: Sep. 24, 2009

(65) Prior Publication Data
US 2011/0007613 A1    Jan. 13, 2011

(30) Foreign Application Priority Data

Mar. 18, 2008 (JP) ................................. 2008-069025
Mar. 18, 2008 (JP) ................................. 2008-069026

(51) Int. Cl.
*G11B 7/00* (2006.01)

(52) U.S. Cl. ............... 369/44.11; 369/13.33; 369/13.35; 369/44.32; 369/47.49; 369/53.19

(58) Field of Classification Search ............... 369/13.33, 369/13.35, 44.11, 44.32, 47.49, 53.19
See application file for complete search history.

(56) References Cited

U.S. PATENT DOCUMENTS
6,366,541 B1 * 4/2002 Ohnuki et al. ............. 369/13.35
(Continued)

FOREIGN PATENT DOCUMENTS
JP    2005-149657    6/2005
(Continued)

OTHER PUBLICATIONS
Supplementary European Search Report issued Jun. 10, 2011 in European Application No. EP 09 72 3559.
(Continued)

*Primary Examiner* — Wayne Young
*Assistant Examiner* — Brenda Bernardi
(74) *Attorney, Agent, or Firm* — Wenderoth, Lind & Ponack, L.L.P.

(57) ABSTRACT

In optical recording and/or reproduction using an SIL optical system that performs a tilt servo using light for recording and/or reproduction, the SIL and an optical recording medium have a high probability of colliding with each other before the tilt servo is started. To prevent the collision, an optical recording/reproduction method performs a gap servo that controls a gap between a surface of an optical recording medium and a bottom surface of an SIL using reflected light that is generated from light traveling from the bottom surface of the SIL and reflecting on the optical recording medium, a focus servo that controls a distance between a focal point of the light and the bottom surface of the SIL, and a tilt servo that controls a tilt of the bottom surface of the SIL relative to the surface of the optical recording medium using the reflected light. The method includes acts which are performed sequentially: starting the gap servo with the gap being set larger than when optical recording and/or reproduction is performed, and shifting the focal point to an optical recording medium side from the bottom surface of the SIL, starting the tilt servo, and setting the gap smaller and arranging the SIL at a predetermined position.

19 Claims, 16 Drawing Sheets

U.S. PATENT DOCUMENTS

| | | | |
|---|---|---|---|
| 6,506,469 B2 * | 1/2003 | Takahashi et al. | 428/64.1 |
| 2004/0013077 A1 | 1/2004 | Saito et al. | |
| 2005/0013236 A1 | 1/2005 | Hirokane et al. | |
| 2005/0180283 A1 | 8/2005 | Ishimoto et al. | |
| 2005/0190666 A1 | 9/2005 | Ishimoto | |
| 2005/0259530 A1 | 11/2005 | Ishimoto et al. | |
| 2006/0255247 A1 | 11/2006 | Saito et al. | |
| 2006/0274610 A1 | 12/2006 | Saito et al. | |
| 2008/0037398 A1 | 2/2008 | Verschuren et al. | |
| 2008/0106982 A1 * | 5/2008 | Seo et al. | 369/44.22 |
| 2008/0239890 A1 * | 10/2008 | Asai | 369/44.23 |
| 2009/0067302 A1 * | 3/2009 | Ishimoto | 369/47.15 |
| 2009/0141597 A1 * | 6/2009 | Verschuren | 369/43 |
| 2009/0190453 A1 * | 7/2009 | Lee et al. | 369/53.19 |

FOREIGN PATENT DOCUMENTS

| | | |
|---|---|---|
| JP | 2005-209246 | 8/2005 |
| JP | 2005-209318 | 8/2005 |
| JP | 2005-259329 | 9/2005 |
| JP | 2006-4596 | 1/2006 |
| JP | 2006-302354 | 11/2006 |
| JP | 2006-302355 | 11/2006 |
| JP | 2006-344351 | 12/2006 |
| JP | 2008-146739 | 6/2008 |
| JP | 2008-305453 | 12/2008 |
| WO | 03/021583 | 3/2003 |
| WO | 2006/018749 | 2/2006 |

OTHER PUBLICATIONS

F. Zijp et al., "Near field read-out of a 50 GB first-surface disk with NA=1.9 and a proposal for a cover-layer incident, dual-layer near field system", Proceedings of SPIE, SPIE, USA, vol. 5380, No. 1, Jan. 1, 2004, pp. 209-223.

International Search Report issued May 26, 2009 in International (PCT) Application No. PCT/JP2009/000808.

Reply filed on May 2009 in International (PCT) Application No. PCT/JP2009/000808.

* cited by examiner

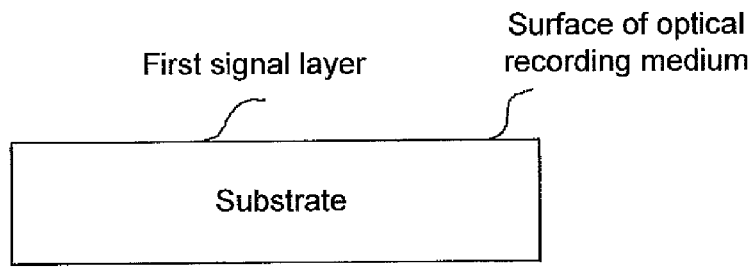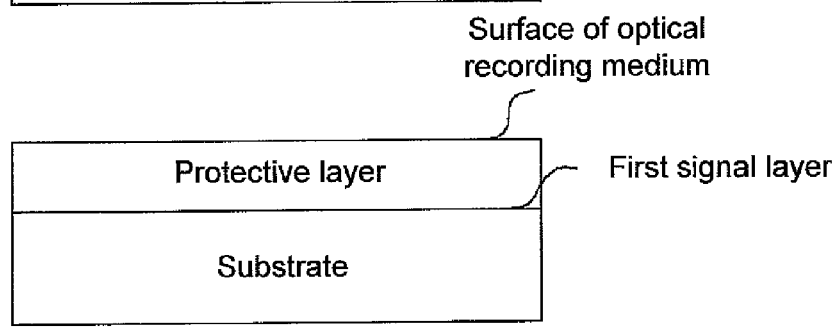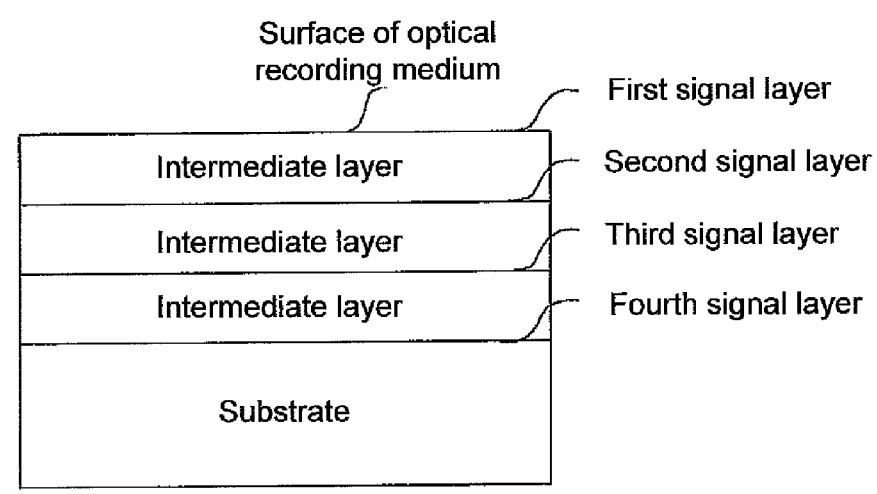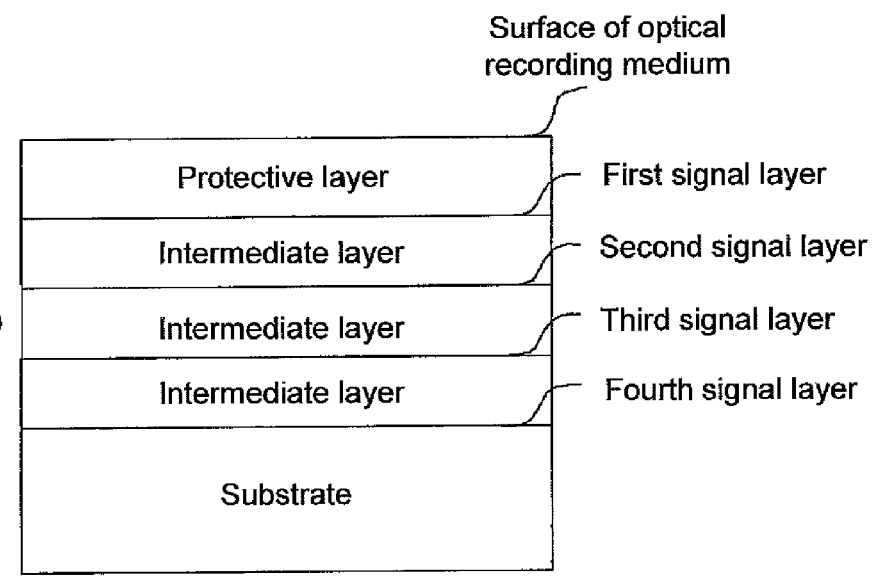

| Offset amount A(μm) | Diameter of light emitting surface Do(μm) | G=λ／4 | G=λ／2 |
|---|---|---|---|
| 0 | 0.2 | Poor | Poor |
| 1.0 | 3.5 | Fair | Poor |
| 2.0 | 6.9 | Good | Poor |
| 3.0 | 10.4 | Good | Poor |
| 4.0 | 13.9 | Good | Fair |
| 5.0 | 17.3 | Good | Fair |
| 6.0 | 20.1 | - | Fair |
| 7.0 | 24.5 | - | Good |

FIG. 7

| Diameter of light emitting surface Do (μm) | Offset amount A (μm) | | |
|---|---|---|---|
| | α = 50 [deg] | α = 60 [deg] | α = 75 [deg] |
| 7 | 2.9 | 2.0 | 0.9 |
| 25 | 10.5 | 7.2 | 3.3 |
| 50 | 21.0 | 14.4 | 6.7 |
| 90 | 37.8 | 26.0 | 12.1 |

FIG. 8

| Refractive index difference | Reflectance (%) | |
|---|---|---|
| | Refractive index of substrate: 1.5 | Refractive index of substrate: 1.6 |
| 0.10 | 0.1 | 0.1 |
| 0.15 | 0.2 | 0.2 |
| 0.20 | 0.4 | 0.3 |
| 0.25 | 0.6 | 0.5 |
| 0.30 | 0.8 | 0.7 |
| 0.35 | 1.1 | 1.0 |
| 0.40 | 1.4 | 1.2 |
| 0.45 | 1.7 | 1.5 |
| 0.50 | 2.0 | 1.8 |
| 0.55 | 2.4 | 2.2 |
| 0.60 | 2.8 | 2.5 |
| 0.65 | 3.2 | 2.9 |
| 0.70 | 3.6 | 3.2 |

FIG. 16

OPTICAL RECORDING/REPRODUCTION METHOD, OPTICAL RECORDING/REPRODUCTION DEVICE, PROGRAM, AND OPTICAL RECORDING MEDIUM

BACKGROUND OF THE INVENTION

I. Technical Field

The present invention relates to an optical recording/reproduction method and an optical recording/reproduction device for optically recording or reproducing signals using near-field, a program, and an optical recording medium.

II. Description of the Related Art

Recording or reproducing on an optical recording medium, such as a DVD, is performed using a spot of light that has converged through an objective lens. The spot size of light will become smaller as the wavelength is shorter, or as the numerical aperture (NA) of the objective lens is larger. The smaller light spot enables recording and reproducing at higher densities. Many efforts have conventionally been made to achieve high density recording and reproduction. Among these efforts, an optical system using a solid immersion lens (SIL) has recently received attention as a technique that significantly increases the NA of an objective lens. The use of the SIL enables the refractive index of light, which is 1 in the atmosphere, to increase at a light incident side in accordance with the composition of the SIL. This can significantly increase the NA of the objective lens.

To efficiently transfer light from the SIL to an optical recording medium using near-field light, the distance between the SIL and the optical recording medium (hereafter referred to as the "gap") needs to be as small as a fraction of the wavelength of the light. The need for such a small gap will cause new problems that are not seen in conventional optical systems.

Before such problems are discussed, an example of a recording/reproduction device using an SIL will now be described with reference to FIGS. 2A and 2B.

As shown in FIG. 2A, light emitted from a light source 201 is collimated through a collimator 202, and the collimated beam then passes through a polarizing beam splitter (PBS) 203 and a quarter-wavelength plate 204. Subsequently, the light beam passes through an objective lens including a convex lens 205 and an SIL 206, and converges on the bottom surface of the SIL. After converging on the bottom surface of the SIL, the light beam then travels through near-field light and reaches a signal layer of an optical recording medium 207. The light beam is reflected and passes through the objective lens and the quarter-wavelength plate. The light beam is then reflected on the PBS 203, and converges on a photo detector (PD) 209 through a convergence lens 208. As shown in FIG. 2B, the PD 209 is divided in four areas 209A, 209B, 209C, and 209D. The light converging through the convergence lens 208 is controlled to form a spot 210 at the center of the entire area of the PD 209 consisting of the four areas. Signals transmitted from the four areas are used for information reproduction, focusing, tilting, and various other purposes. The objective lens is adjustable horizontally, vertically, and in the direction of tilt using an actuator 211, a tilt adjustment unit 212, and the like. For ease of explanation, FIGS. 2A and 2B only show a simplified basic structure of the optical recording/reproduction device. A typical recording/reproduction device can often include different light sources and different PDs for recording and reproduction and for servo control. Depending on purposes, the recording/reproduction device can also use PDs that are divided in two areas or PDs that are not divided in a plurality of areas.

The problems associated with the SIL optical system will now be described.

A first problem is that the gap of as small as substantially a ten-thousandth part of the conventional gap between the SIL and the optical recording medium is extremely difficult to maintain using conventional techniques. A gap servo, which is described for example in Domestic Re-publication of International Publication No. 03/021583, has been proposed as an effective technique to solve this problem. With the gap servo technique, the amount of reflected light from the total reflection area formed on the bottom surface of the SIL, which varies depending on the gap, is detected using a PD 209, a signal determined according to the detected amount of reflected light is then input into a gap servo circuit, and an actuator 211 is driven using the gap servo circuit in a manner that the gap will be constant. As shown in FIG. 3, the amount of reflected light from the total reflection area is constant when the gap is sufficiently large. In a near-field area, the gap is substantially half the wavelength or less. In that area, the amount of reflected light tends to decrease as the gap becomes smaller. Based on this tendency, the gap can be estimated using the reflected light amount.

Also, because the SIL optical system provides such an extremely small gap between the SIL and the optical recording medium, even slight tilting of the surface of the optical recording medium and the bottom surface of the SIL relative to each other can cause the two surfaces to contact each other. A tilt servo, which uses reflected light from the total reflection area of the bottom surface of the SIL like the gap servo, has been proposed as a technique to solve this problem. With the tilt servo technique, the asymmetry of reflected light occurring when the gap between the SIL and the optical recording medium becomes uneven due to tilting is detected using a PD 209, and a tilt adjustment unit is driven using a tilt servo circuit in a manner that the tilting will be eliminated accordingly. The tilt servo may be performed using a light source different from a light source used for recording and reproduction, or may also be performed using the same light source as that for recording and reproduction. The tilt servo technique that uses the same light source both for the tilt servo and for recording and reproduction is strongly preferred because this technique requires a lower manufacturing cost and enables easier adjustment of the optical system. However, the tilt servo technique that uses the same light source has yet to be commercialized due to the problems described below. Examples of the technique that uses the same light source both for the tilt servo and for recording and reproduction are described in Japanese Unexamined Patent Publication No. 2005-259329 and Japanese Unexamined Patent Publication No. 2006-4596.

Patent Citation 1: Domestic Re-publication of International Publication No. 03/021583

Patent Citation 2: Japanese Unexamined Patent Publication No. 2005-259329

Patent Citation 3: Japanese Unexamined Patent Publication No. 2006-4596

SUMMARY OF THE INVENTION

The above tilt servo has the problems described below.

A first problem is that the bottom surface of the SIL and the optical recording medium have a high probability of colliding with each other before the tilt servo is started. The above tilt servo will maintain the tilt to be small in an area in which the tilt is near zero. However, a problem occurs when the tilt servo is started. A conventional optical system that does not use an SIL easily prevents an objective lens and an optical recording medium from contacting each other even before a tilt servo is started. However, because the optical system including the SIL provides an extremely small gap between the objective lens and the optical recording medium, such an optical system has a high probability that even slight tilting of the surface of the optical recording medium and the SIL relative to each other will cause the surface of the optical recording medium to collide with the SIL and damage the SIL.

A second problem is that the tilt servo technique described in Patent Citation 2 requires the initial tilt adjustment to be performed while the optical recording medium is stationary. This lengthens the time taken to actually access an information layer of the optical recording medium. Moreover, if the SIL and the optical recording medium contact each other, the SIL is likely to be soiled or damaged.

A third problem is that the tilt servo technique described in Patent Citation 3 requires the optical system to have a complicated structure. The optical system having a complicated structure is extremely difficult to adjust. Other conventional tilt servo techniques can also share this problem when they require the optical system to have a complicated structure in which different light sources are used for recording and reproduction and for a tilt servo.

To solve the above problems, it is an object of the present invention to provide an optical recording/reproduction method using an SIL optical system for preventing an SIL and an optical recording medium from colliding with each other when a tilt servo is started, while allowing the optical system to have a simple structure in which light used for recording and/or reproduction is partially used for the tilt servo.

Technical Solution

To solve the above problems, an optical recording/reproduction method of the present invention is an optical recording/reproduction method of performing a gap servo that controls a gap between a surface of an optical recording medium and a bottom surface of an SIL using reflected light that is generated from light traveling from the bottom surface of the SIL and reflecting on the optical recording medium, a focus servo that controls a distance between a focal point of the light and the bottom surface of the SIL, and a tilt servo that controls a tilt of the bottom surface of the SIL relative to the surface of the optical recording medium using the reflected light. The method includes the acts: (A) starting the gap servo with the gap being set larger than when optical recording and/or reproduction is performed, and shifting the focal point to an optical recording medium side from the bottom surface of the SIL, (B) starting the tilt servo, and (C) setting the gap smaller and arranging the SIL at a predetermined position. The acts (A), (B), and (C) are performed sequentially.

Shifting the focal point to the optical recording medium side from the bottom surface of the SIL includes shifting the focal point not only to a position on the optical recording medium but also to a position within the gap between the bottom surface of the SIL and the recording medium.

The predetermined position may be, for example, a position set for recording and/or reproduction. The light may be, for example, light used for recording and/or reproduction.

In the act (A), starting the gap servo with the gap being set larger than when optical recording and/or reproduction is performed, and shifting the focal point to the optical recording medium side from the bottom surface of the SIL may be performed either in the stated order or in an order opposite to the stated order.

The tilt servo is started before the SIL is moved to the position nearest the optical recording medium. This mini-mizes the probability of causing the SIL and the optical recording medium to contact each other. As the gap becomes larger, the asymmetry of the reflected light from the bottom surface of the SIL decreases more (the optical gain decreases more) and the tilt servo becomes more difficult to start. However, shifting the focal point to the optical recording medium side from the bottom surface of the SIL in the act (A) will cause the light used for recording and/or reproduction to have a larger cross section at the bottom surface of the SIL (hereafter referred to as the "light emitting surface of the SIL"), and increase the asymmetry of the reflected light (increase the optical gain). This enables the tilt servo to be started in a stable manner.

In the act (A), the focal point may be shifted to a position near a signal layer of the optical recording medium, the signal layer being most distant from the bottom surface of the SIL among one or more signal layers of the optical recording medium on which the focal point is to be formed.

Shifting the focal point to the position near the signal layer refers to shifting the focal point to a position near a target signal layer as much as possible, and includes shifting the focal point to a position on the signal layer and to a position that is not on the signal layer but is near a position on the signal layer.

Further, the focal point may be shifted using an initial condition of the focus servo.

In this case, the light can be focused onto a signal layer that is at the most distant position.

Alternatively, in the act (A), the focal point may be shifted to a position near a signal layer of the optical recording medium, the signal layer being nearest to the bottom surface of the SIL among one or more signal layers of the optical recording medium on which the focal point is to be formed. In this case, the focal point may be shifted using an initial condition of the focus servo.

In this case, the light can be focused onto a signal layer that is at the nearest position.

Further, in the optical recording medium including a plurality of signal layers on which the focal point is to be formed from one side of the optical recording medium, a circuit gain of the tilt servo may be changed in accordance with a distance between the bottom surface of the SIL and the signal layers of the optical recording medium.

This method enables the amount of change in the optical gain to be corrected, and stabilizes the tilt servo. In this case, the optical gain may increase as the distance between the bottom surface of the SIL and each of the plurality of signal layers is larger. Thus, the circuit gain of the tilt servo may be reduced more as a distance between the bottom surface of the SIL and each of the plurality of signal layers is larger.

Further, in the act (A) of the optical recording/reproduction method of the present invention, a position of the bottom surface of the SIL may be detected using the focus servo. This method enables the focal point to be shifted to a predetermined position with a high precision even when any deviation occurs in the optical system.

Further, in the act (B) of the optical recording/reproduction method of the present invention, a diameter Do of the light emitting surface of the SIL from which the light is emitted may be adjusted to fall within a range of 7 to 90 µm inclusive. This reduces the probability of causing the SIL and the optical recording medium to collide with each other.

Further, a diameter Do of the light emitting surface of the SIL may be adjusted to fall within a range of 25 to 50 µm inclusive. This reduces the probability of causing the SIL and the optical recording medium to collide with each other further.

The optical recording/reproduction device of the present invention is an optical recording/reproduction device including a gap servo mechanism arranged to control a gap between a surface of an optical recording medium and a bottom surface of an SIL using reflected light that is generated from light traveling from the bottom surface of the SIL and reflecting on the optical recording medium, a focus servo mechanism arranged to control a distance between a focal point of the light and the bottom surface of the SIL, and a tilt servo mechanism arranged to control a tilt of the bottom surface of the SIL relative to the surface of the optical recording medium using the reflected light. The device performs (A) starting a gap servo with the gap being set larger than when optical recording and/or reproduction is performed, and shifting the focal point to an optical recording medium side from the bottom surface of the SIL, (B) starting the tilt servo, and (C) setting the gap smaller and arranging the SIL at a predetermined position. The device performs the acts (A), (B), and (C) sequentially.

A computer program of the present invention is a program enabling a computer to implement a gap servo that controls a gap between a surface of an optical recording medium and a bottom surface of an SIL using reflected light that is generated from light traveling from the bottom surface of the SIL and reflecting on the optical recording medium, a focus servo that controls a distance between a focal point of the light and the bottom surface of the SIL, and a tilt servo that controls a tilt of the bottom surface of the SIL relative to the surface of the optical recording medium using the reflected light. The program enables the computer to implement (A) starting the gap servo with the gap being set larger than when optical recording and/or reproduction is performed, and shifting the focal point to an optical recording medium side from the bottom surface of the SIL, (B) starting the tilt servo, and (C) setting the gap smaller and arranging the SIL at a predetermined position. The acts (A), (B), and (C) are performed sequentially.

An optical recording medium of the present invention is an optical recording medium on which optical recording and/or reproduction is performed using an SIL optical system. The optical recording medium includes a substrate, a protective layer, and at least one signal layer. The signal layer is formed between the substrate and the protective layer to have a distance from a bottom surface of the SIL falling within a range of 0.9 to 38 μm inclusive. Further, the signal layer includes a pull-in area having a surface gradient $\theta$ satisfying $\theta < \arcsin(\lambda/D)$, where $\lambda$ is a wavelength of light traveling from the SIL, and D is a diameter of the bottom surface of the SIL or a longest shaft diameter of the SIL. The pull-in area has a width of 20 μm or more in a radius direction, extending over an entire circumference of the signal layer.

The pull-in area is an area in which pulling in for focusing on the optical recording medium is performed. The pull-in area may be, for example, a management area storing management information that is accessed initially by the recording/reproduction device.

This structure minimizes the surface gradient of the optical recording medium within a range in which the manufacture of such an optical recording medium is possible, and reduces the probability of causing the SIL and the optical recording medium to collide with each other.

Further, the signal layer may have a distance from the bottom surface of the SIL falling within a range of 3.3 to 21 μm inclusive.

Further, the surface gradient $\theta$ of the pull-in area may satisfy $\theta < \arcsin(\lambda/2D)$.

The pull-in area may be arranged at a position corresponding to a radius falling within a range of 16 to 43 mm inclusive, or may be arranged at a position corresponding to a radius falling within a range of 17 to 25 mm inclusive.

A difference between a refractive index of the substrate and a refractive index of the protective layer may be 0.35 or more. The optical recording medium may further include a plurality of signal layers and an intermediate layer formed between the plurality of signal layers. In this case, a difference between the refractive index of the substrate and a refractive index of the intermediate layer may be 0.35 or more.

Further, the refractive index difference may be 0.45 or more.

According to the optical recording/reproduction method, the optical recording/reproduction device, the program, and the optical recording medium of the present invention, even with an SIL optical system, an SIL and an optical recording medium are prevented from colliding with each other when a tilt servo is started.

BRIEF DESCRIPTION OF DRAWINGS

FIGS. 4A to 4D show examples of the structure of an optical recording medium.

FIG. 7 shows the stability of a tilt servo performed with the optical recording/reproduction method according to the first embodiment.

FIG. 8 shows the relationship between the diameter of a light emitting surface and the offset amount with the optical recording/reproduction method according to the first embodiment.

FIG. 16 shows the relationship between the refractive index difference and the reflectance of the optical recording medium according to the second embodiment.

DETAILED DESCRIPTION OF THE INVENTION

First Embodiment

A recording/reproduction method according to a first embodiment of the present invention and a recording/reproduction device that implements the recording/reproduction method will now be described with reference to the drawings.

Figures 1A, 1B, 1C:
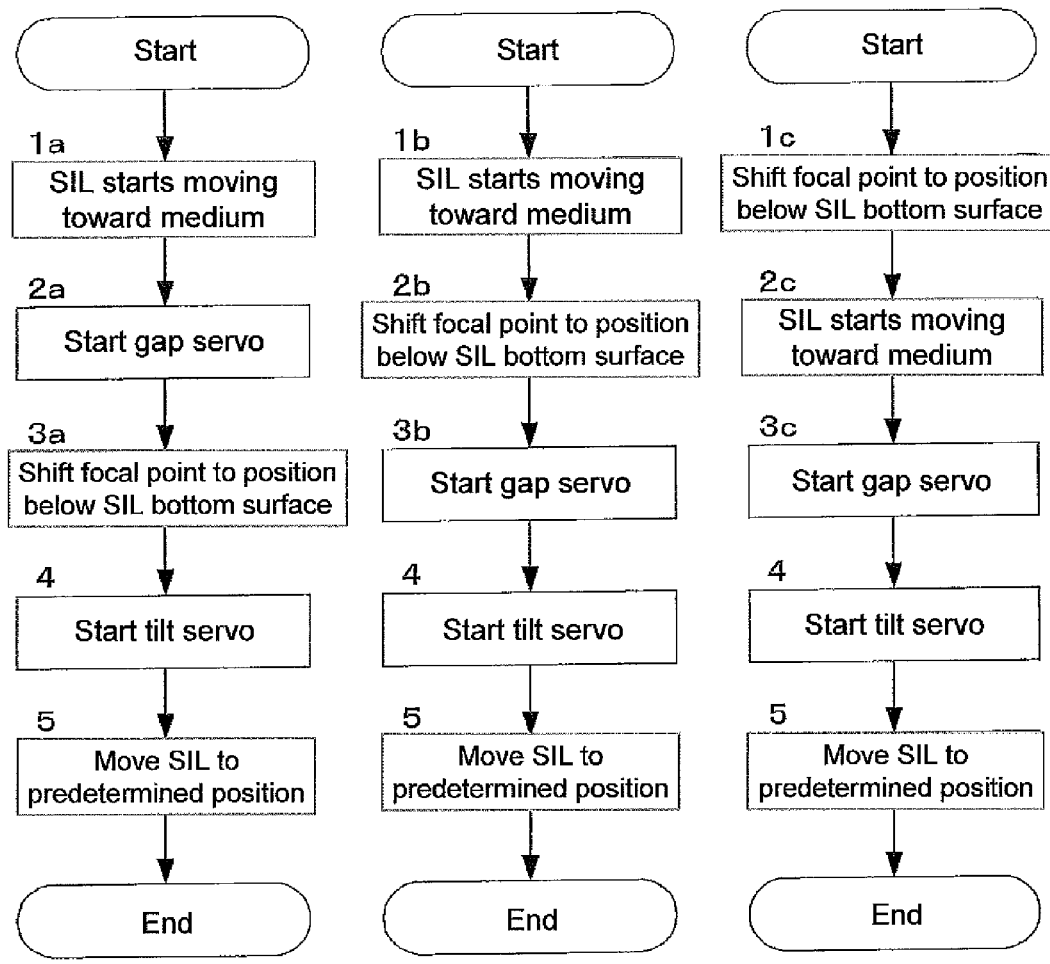
FIGS. 1A to 1C are flowcharts showing examples of an optical recording/reproduction method according to a first embodiment of the present invention.
Figure 2A:
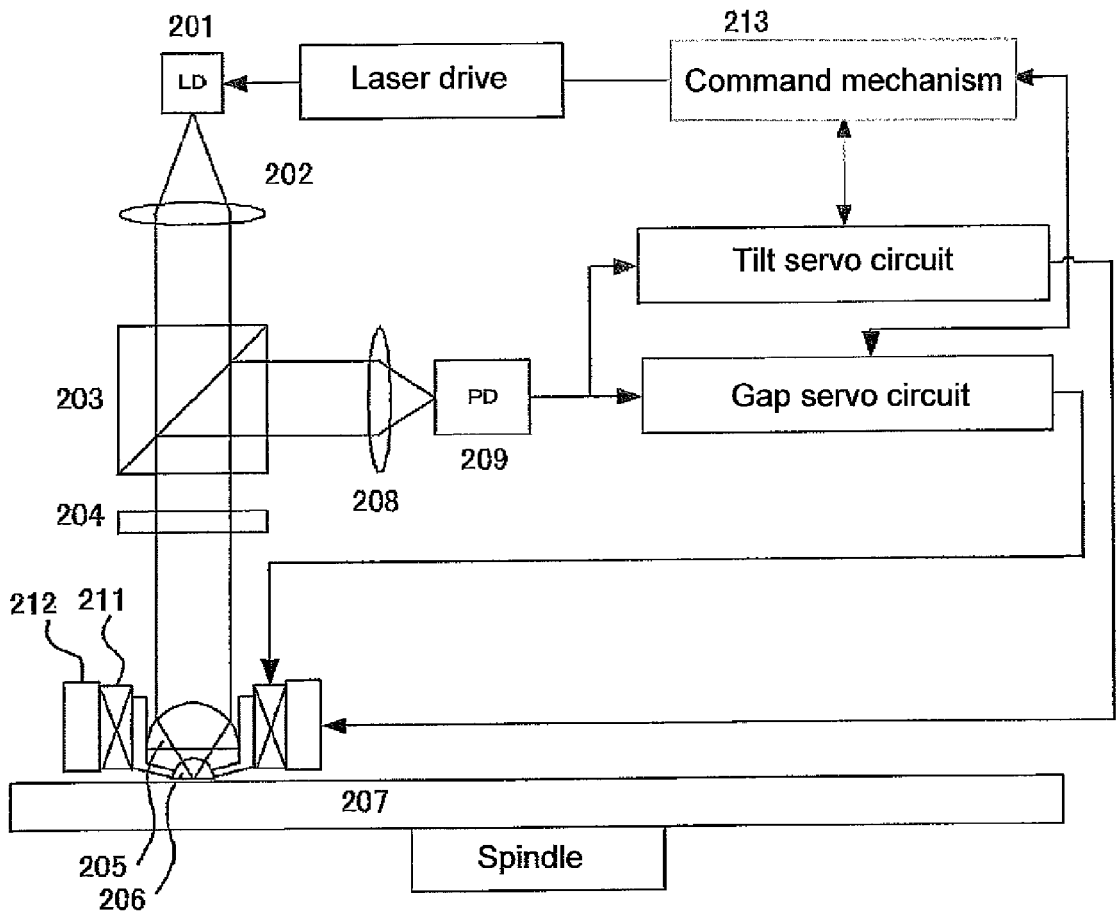
FIG. 2A shows the structure of an optical recording/reproduction device according to the first embodiment.
Figure 2B:
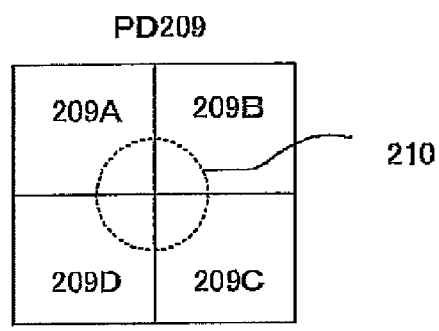
FIG. 2B shows areas of a PD included in the optical recording/reproduction device.

FIGS. 1A to 1C are examples of flowcharts illustrating the optical recording/reproduction method of the present embodiment. FIGS. 2A and 2B show an example of the optical recording/reproduction device of the present embodiment. FIGS. 4A to 4D show examples of the structure of an optical recording medium that can be used with the optical recording/reproduction method of the present embodiment.

In the present embodiment, optical recording/reproduction refers to optically performing either recording or reproduction, or optically performing both recording and reproduction.

Optical Recording/Reproduction Device

The optical recording/reproduction method of the present embodiment is implemented by the optical recording/reproduction device shown in FIGS. 2A and 2B. As shown in FIG. 2A, light emitted from a light source 201 is collimated through a collimator 202, and the collimated beam then passes through a PBS 203 and a quarter-wavelength plate 204. Subsequently, the light beam passes through an objective lens including a convex lens 205 and an SIL 206, and converges on the bottom surface of the SIL. The light beam then travels through near-field light and reaches a signal layer of an optical recording medium 207. The light beam is reflected and passes through the objective lens and the quarter-wavelength plate. The light beam is then reflected on the PBS 203, and converges on a photo detector (PD) 209 through a convergence lens 208. As shown in FIG. 2B, the PD 209 is divided in four areas 209A, 209B, 209C, and 209D. The light converging through the convergence lens 208 is controlled to form a spot 210 at the center of the entire area of the PD 209 consisting of the four areas. Signals transmitted from the four areas are used for information reproduction, focusing, tilting, and various other purposes. The objective lens is adjustable horizontally, vertically, and in the direction of tilt using an actuator 211, a tilt adjustment unit 212, and the like.

The components of the optical recording/reproduction device, such as a lens, an actuator, and a tilt servo circuit, may be formed using conventional techniques. The uniqueness of the optical recording/reproduction method of the present embodiment lies in the operation method and procedures with which those components perform their individual functions. The optical recording/reproduction device of the present embodiment is unique in its command mechanism 213, which stores and implements the above optical recording/reproduction method.

The command mechanism 213 includes a memory and an arithmetic unit. The command mechanism 213 calculates the operation to be performed by each component based on information stored in the memory or information that is output as necessary from each component. Based on the calculation results, the command mechanism 213 outputs a command associated with an initial condition, an operational procedure, and an operational method to each component. Although the command mechanism 213 is formed as a single part in FIG. 2A, the command mechanism 213 may consist of a plurality of parts, which may be arranged dispersedly in other components of the device, such as a tilt servo circuit and a gap servo circuit.

For ease of explanation, FIGS. 2A and 2B show a simplified basic structure of the optical recording/reproduction device of the present embodiment. The components of the optical recording/reproduction device, such as the lens, the actuator, and the tilt servo circuit, may not be formed in the manner shown in the figure. The components are only required to have their basic functions, and may be formed in other manners so that the advantageous effects of the present embodiment will not be degraded. Further, parts of the method, the device, and the medium that can use conventional techniques will not be described in detail.

Optical Recording/Reproduction Method

An operational procedure implementing the optical recording/reproduction method of the present embodiment will now be described with reference to FIGS. 1A to 1C. The optical recording/reproduction method of the present embodiment prevents the SIL and an optical recording medium from contacting each other even when the SIL and the optical recording medium tilt relative to each other, and enables the SIL and the optical recording medium to shift to a recording/reproduction status in a stable manner. The processes of the optical recording/reproduction method will be performed in the procedure described below before the SIL is moved to a predetermined position set for optical recording/reproduction.

First, the status is set to satisfy the three conditions below (the status satisfying the three conditions is hereafter referred to as the "status A"):

The first condition: the gap (the distance between the SIL and the optical recording medium) is set larger than when optical recording/reproduction is actually performed.

The second condition: the focal point of the light used for recording and/or reproduction is at the optical recording medium side from the bottom surface of the SIL.

The third condition: a gap servo has been started.

The operations intended to satisfy these three conditions are performed preferably with, for example, the procedures shown in FIGS. 1A, 1B, and 1C, with which the operations can be performed smoothly. However, any procedure taken for these operations would not affect the advantageous effects of the present embodiment.

The reasons for setting the status A before the SIL is arranged at the predetermined position for optical recording/reproduction will now be described.

Figure 3:
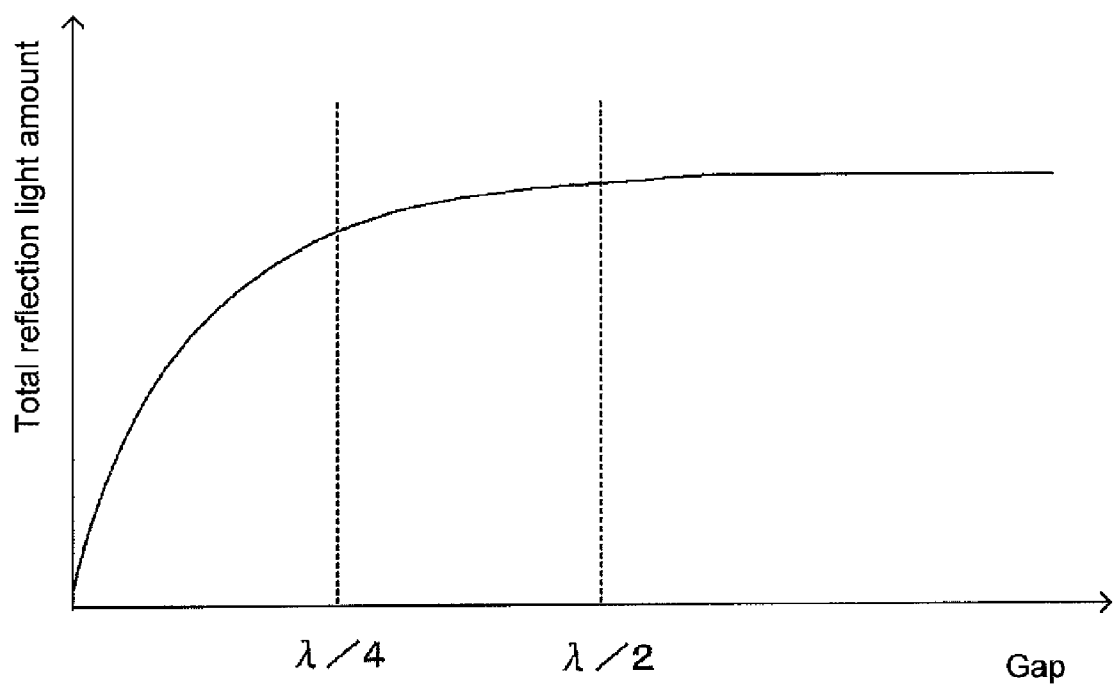
FIG. 3 shows the relationship between the gap and the total reflection amount.

In this status, the gap is set larger than when recording/reproduction is performed. With the larger gap, the probability that the SIL and the optical recording medium contact each other is significantly lower. During recording/reproduction, the gap is typically set to as small as substantially $\lambda/20$ to maximize the transmission efficiency of near-field light. In the status A, the gap is maintained at substantially $\lambda/2$ (see FIG. 3), which is the upper limit for starting a gap servo. This increases the permissible tilt of the optical recording medium and the SIL relative to each other substantially 10 times, and significantly reduces the probability that the SIL and the optical recording medium contact each other. However, when the gap is set at $\lambda/2$, the optical gain for a gap servo (the change rate of an optical signal that is detected on the PD 209 relative to the amount of change in the gap or in the tilt) can be so small that the gap servo may fail to be performed in a stable manner. In that case, the gap in the status A may be reduced to substantially $\lambda/4$. This will increase the optical gain considerably, or more specifically several to ten times, and will stabilize the gap servo.

Figure 5A:
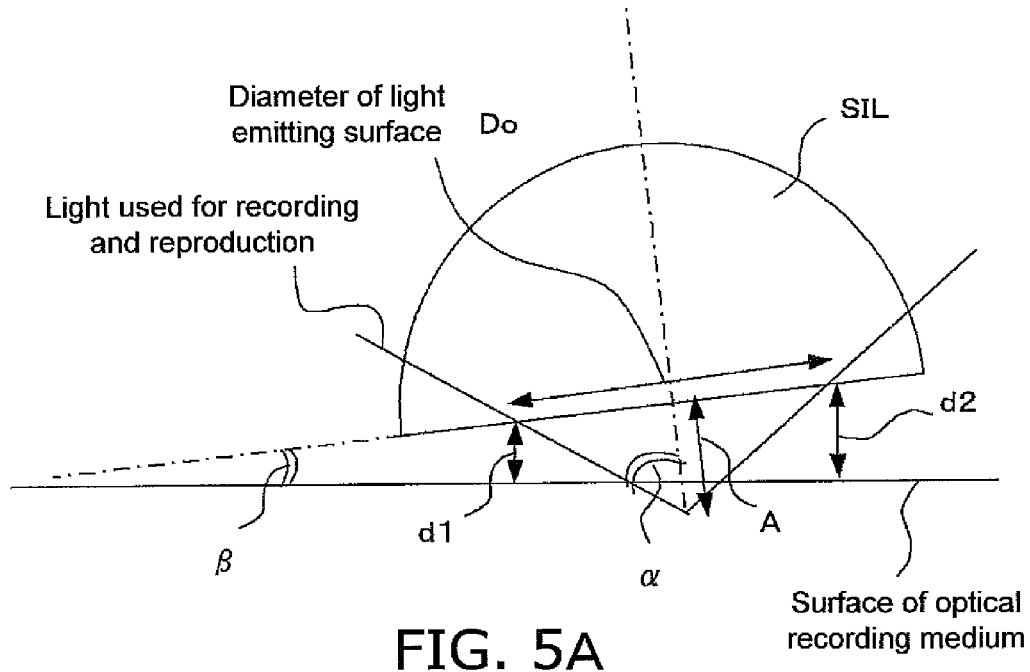
FIGS. 5A and 5B show the positional relationship between an SIL and an optical recording medium used with the optical recording/reproduction method according to the first embodiment.

The optical gain for a tilt servo also decreases as the gap is set larger. With the smaller optical gain, the tilt servo may fail to be performed in a stable manner. In the status A, however, the focal point of the light used for recording/reproduction is at the optical recording medium side from the bottom surface of the SIL as shown in FIG. 5A. This considerably increases the optical gain. This optical gain increase will now be described in detail.

The tilt servo using the recording/reproduction light is performed based on the asymmetry of the spot 210 formed on the PD 209. The asymmetry of the spot 210 changes in accordance with a difference between distances d1 and d2 shown in FIG. 5A. When an angle β indicating the relative tilt of the SIL and the optical recording medium is the same, the difference between the distances d1 and d2 is directly proportional to a diameter Do of the light emitting surface of the recording/reproduction light. In other words, the optical gain is larger as the diameter of the light emitting surface is larger.

Figure 5B:
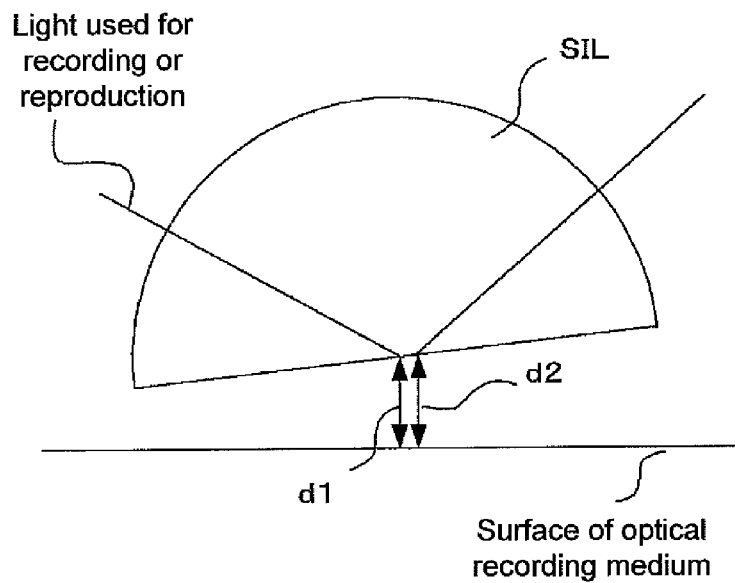

With the conventional recording/reproduction method, the focal point is on the bottom surface of the SIL as shown in FIG. 5B when the tilt servo is performed. In this case, the light emitting surface is substantially as small as the size of the focal point of the recording/reproduction light. The size of the focal point is directly proportional to the wavelength λ of the recording/reproduction light, and is inversely proportional to the NA of the objective lens. Although the factor of proportionality may vary to some extent depending on the design of the optical system, the size of the focal point may be substantially 200 nm when the wavelength is 405 nm and the NA is 1.65. In contrast, with the recording/reproduction method of the present embodiment, the diameter Do of the light emitting surface is written as $$Do = 2*A*\tan \alpha,$$

where α is the aperture stop angle of the objective lens, and A is the offset amount of the focal point from the SIL.

When, for example, the offset amount A is 1 μm and the aperture stop angle α is 60 degrees, the diameter Do is substantially 3.5 μm. More specifically, the diameter Do is significantly larger, or specifically 10 to 20 times larger than the diameter obtained with the conventional method. The larger diameter Do compensates for the decrease in the optical gain caused by the large gap. This enables the tilt servo to be performed in a stable manner in the status A.

As described above, the tilt servo can be performed with the larger gap in the status A than the gap of the conventional method.

After the status A is set, the tilt servo is first started (process 4 in FIGS. 1A to 1C). While the tilt servo is being performed, the relative tilt of the SIL and the optical recording medium is maintained to be small. In this state, the SIL can be moved toward the optical recording medium, or to a position at which optical recording/reproduction is to be performed, without causing the SIL and the optical recording medium to contact each other (process 5 in FIGS. 1A to 1C). When the SIL has been moved to a position at which optical recording/reproduction is to be performed, or more specifically to a position at a distance of, for example, as close as 20 nm from the optical recording medium, the optical gain would be sufficiently large to perform the tilt servo even with a smaller diameter Do. The sufficiently large optical gain enables the focal point position to be changed freely, and enables focusing to be achieved on a predetermined signal layer.

An optical recording medium used with the method of the present embodiment or used by the device of the present embodiment may have the structure shown in each of FIGS. 4A to 4D. In the structure shown in FIG. 4A, a signal layer is formed on the surface of the recording medium. In the structure shown in FIG. 4B, a protective layer is formed on a single signal layer. In the structure shown in FIG. 4C, a plurality of signal layers are separated by intermediate layers, and one of the plurality of signal layers is formed on the surface of the recording medium. In the structure shown in FIG. 4D, a plurality of signal layers are separated by intermediate layers, and a protective layer is formed on the surface of the recording medium. After the process 5 shown in FIGS. 1A to 1C, the tilt servo can be performed in a stable manner when the focal point is formed on, for example, the first signal layer in the optical recording media shown in FIG. 4A and FIG. 4C. FIGS. 4A to 4D show mere examples of the basic structure of the optical recording medium used in the present embodiment, and do not show all possible numbers and all possible arrangements of the signal layers.

The status A will now be described in more detail. The conditions and structures described herein only intend to maximize the advantageous effects of the present embodiment. The present embodiment should not be limited to the scope of the conditions and structures described below.

The first condition of the status A will first be described.

With the method according to the present embodiment described above, the tilt servo can be started while the gap is larger than the conventional gap. This reduces the probability that the SIL and the optical recording medium collide with each other. However, significant tilting of the SIL and the optical recording medium relative to each other may cause the SIL and the optical recording medium to collide with each other even with this larger gap, which is required as the first condition of the status A. The boundary condition of whether the SIL and the optical recording medium collide with each other is written as $$\beta = \arcsin(2G/D),$$

where β is an angle indicating the relative tilt of the SIL and the optical recording medium, D is the diameter of the bottom surface of the SIL, and G is the gap.

Figure 6:
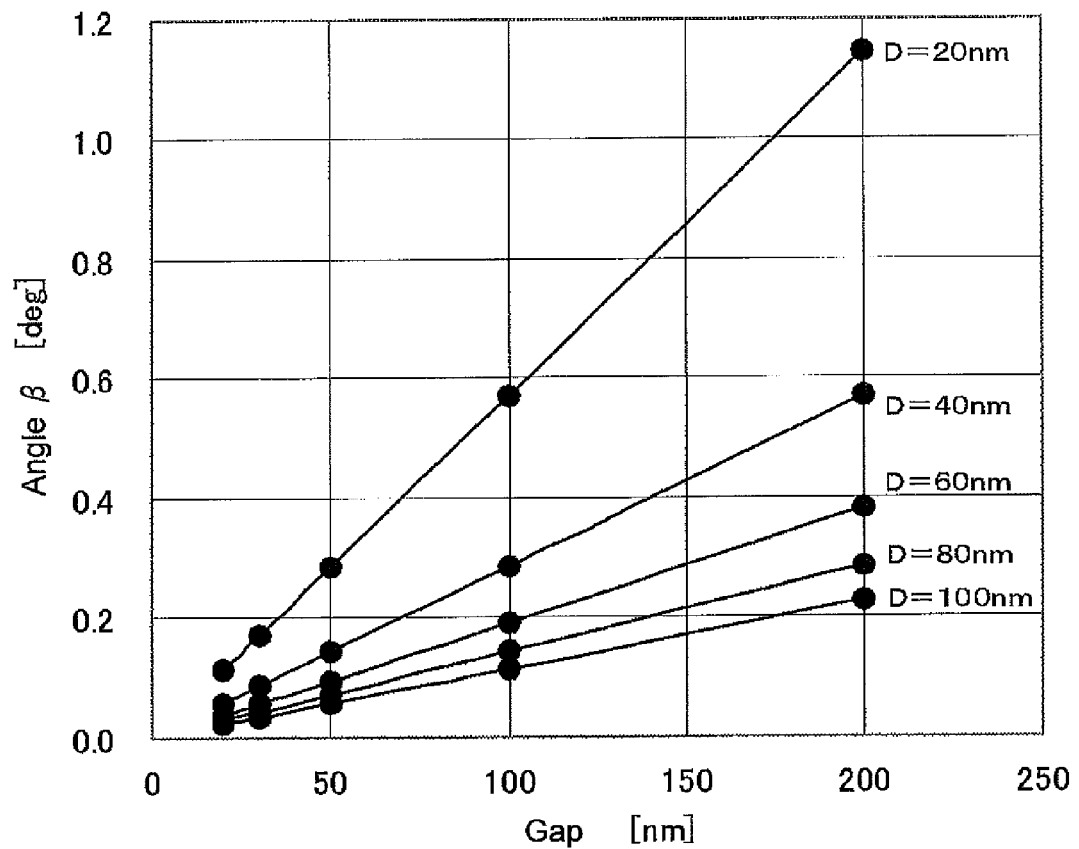
FIG. 6 shows the relationship between the gap and the angle $\beta$ with the optical recording/reproduction method according to the first embodiment.

FIG. 6 shows the relationship between the angle β and the gap G corresponding to the diameter D. When light having a wavelength of substantially 400 nm is used as the recording/reproduction light, the gap of 100 nm corresponds to λ/4 and the gap of 200 nm corresponds to λ/2. The graphs indicate that the diameter D of the bottom surface of the SIL should be smaller to increase the angle β. As described above, the diameter Do of the light emitting surface of the SIL satisfies the relationship:

$$Do < D.$$

To increase the diameter Do in order to stabilize the tilt servo, the diameter D should preferably be larger. The diameter Do needs to be set in an appropriate manner by considering the two requirements.

The diameter Do should be tens to hundreds times the conventional diameter to sufficiently stabilize the tilt servo. FIG. 7 shows the test results indicating the actual effects of such a diameter Do. FIG. 7 shows the stability of the tilt servo that is evaluated when the gap G is λ/4 and the gap G is λ/2 by varying the offset amount A of the focal point from the bottom surface of the SIL. The optical system used in the test has the NA of 1.65, the angle α of 60 degrees, and the wavelength λ of 405 nm. The diameter Do is calculated using the offset amount A and the angle α.

The stability of the tilt servo is expressed using three evaluation results: "poor" when the servo cannot be started, "fair" when the servo can be started but becomes unstable in less than a minute, and "good" when the servo can be performed in a stable manner for at least one minute. The evaluation results reveal that the diameter Do of the light emitting surface is preferably 7 μm or more when $G=\lambda/4$, and is preferably 25 μm or more when $G=\lambda/2$ to enable the stable servo. The diameter Do having these values will increase the advantageous effects of the present embodiment. Considering an error margin of ±5 μm for an error occurring in processing the SIL or in optical axis adjustment, the diameter D of the bottom surface of the SIL is preferably larger than the diameter Do by 10 μm and is preferably 17 μm or more, and more preferably 35 μm or more.

The gap G between the SIL and the optical recording medium is preferably large to prevent the collision between them. The gap G is thus preferably set to $\lambda/2$, which is the largest gap with which the effect of the near-field light can be produced. To obtain the sufficiently large optical gain as described above, the gap G may need to be reduced to substantially $\lambda/4$.

The conditions required for the angle β with which the collision can be prevented when the gap G is $\lambda/2$ and is $\lambda/4$ can be calculated as follows:

$\beta < \arcsin(\lambda/D)$ when $G=\lambda/2$, and $\beta < \arcsin(\lambda/2D)$ when $G=\lambda/4$.

Although the tilt adjustment is relatively easy for elements other than the optical recording medium, the gradient θ of the surface of the optical recording medium needs to satisfy the conditions below even when the tilt of the optical recording medium is adjusted to substantially zero. The gradient θ refers to the gradient of the optical recording medium relative to a plane whose normal line corresponds to the axis of rotation of the optical recording medium.

$\theta < \arcsin(\lambda/D)$ when $G=\lambda/2$ $\theta < \arcsin(\lambda/2D)$ when $G=\lambda/4$ Implementing the recording/reproduction method of the present embodiment within a range in which the surface gradient θ of the optical recording medium satisfies these conditions will significantly reduce the probability of the collision between the SIL and the optical recording medium.

The feasibility of the optical recording medium, the optical recording/reproduction method, and the optical recording/reproduction device of the present embodiment that satisfy the above conditions will be additionally discussed here. The trial manufacture of optical recording media used in the present embodiment has revealed that optical recording media having the surface gradient θ of substantially 0.2 degree can be manufactured in a stable manner. This will be described in detail later. The diameter D to permit this gradient value can be estimated as 100 μm or less when $G=\lambda/2$ based on the graphs in FIG. 6. The diameter D can further be estimated as substantially 60 μm or less when $G=\lambda/4$, at which the tilt servo can be stabilized. As described above, the diameter D is required to be 17 μm or more, or preferably 35 μm to sufficiently increase the optical gain for the tilt servo. Considering all these findings, the above conditions can be satisfied sufficiently.

To sum up, the diameter D is preferably in a range of 17 to 100 μm inclusive, and is more preferably in a range of 35 to 60 μm inclusive. The diameter D falling within these ranges can increase the advantageous effects of the present embodiment. The upper limit of the diameter Do can be determined based on the diameter D. Considering an error margin of ±5 μm for an error occurring in processing of the SIL and in optical axis adjustment, the diameter Do is preferably in a range of 7 to 90 μm inclusive, and is more preferably in a range of 25 to 50 μm inclusive. The diameters D and Do may not necessarily be within the above specified ranges. Although the diameters D and Do outside these ranges may reduce the advantageous effects of the present embodiment, such diameters will not completely eliminate the advantageous effects of the present embodiment.

The second condition of the status A will now be described. To set the focal point at the optical recording medium side from the bottom surface of the SIL, the focal point position needs to be determined precisely. The simplest method to enable precise determination of the focal point position is to record the focal point position in the recording/reproduction device during manufacture, and read the recorded focal point position during recording/reproduction. However, the focal point position recorded during manufacture can deviate from the focal point position used during recording/reproduction due to some factors. To compensate for such deviation, the focal point is preferably passed through the bottom surface of the SIL in the process of setting the status A, and the S-shaped curve of the resulting focus signal is detected, and the resulting focal point position is then adjusted to eliminate any deviation from the focal point position recorded during manufacture. When this method is used, the focal point position may not necessarily be recorded in the device, but a next focal point position may be calculated based on conditions under which the S-shaped curve has been detected, and the calculated focal point may then be used.

The focal point setting will now be described.

To stabilize the tilt servo, the offset amount of the focal point is preferably as large as possible. The diameter Do of the light emitting surface set to fall within the above-specified range will increase the advantageous effects of the present embodiment. However, to increase the convenience after the tilt servo is stabilized, the focal point may be set in the manner described below. This focal point setting will enable the present embodiment to have additional advantageous effects.

When the offset amount of the focal point is set as large as possible, the focal point will be shifted to a position nearest the signal layer arranged at the deepest level (the first signal layer in FIGS. 4A and 4B and the fourth signal layer in FIGS. 4C and 4D). The optical recording medium may include either a single signal layer or a plurality of signal layers. The optical recording/reproduction device of the present embodiment can focus on any signal layer of the optical recording medium. The optical recording/reproduction device of the present embodiment prestores the initial condition for the focus servo to be used when focusing on the deepest one of all signal layers that can be focused from one side. The optical recording/reproduction device then shifts the focal point using the initial condition for the focus servo. In this case, the optical recording/reproduction device is only required to adjust the gap to the predetermined gap set for the recording/reproduction status after the tilt servo is started. As a result, the focus servo can then be started smoothly.

When the optical recording medium includes a plurality of signal layers, the focal point may be shifted to a position nearest the signal layer arranged at the shallowest level among the signal layers that can be focused from one side (the first signal layer in FIGS. 4A to 4D). This method also has an advantageous effect. This method shortens the access time by the optical recording/reproduction device when the device is required to access the signal layer arranged at the shallowest level first in the case where, for example, the signal layer arranged at the shallowest level includes a management area storing management information, such as information indicating the type of the optical information recording medium, its recommended methods for use, and the arrangement of its data. This method of first focusing on the signal layer arranged at the shallowest level minimizes the number of S-shapes of focus signals to be counted, and thus will reduce erroneous counts. The optical recording/reproduction device of the present embodiment prestores the initial conditions for the focus servo to be used when focusing on the signal layer arranged at the shallowest level. The optical recording/reproduction device shifts the focal point using the initial condition for the focus servo. In this case, the optical recording/reproduction device is only required to adjust the gap to the predetermined gap set for the recording/reproduction status after the tilt servo is started. As a result, the focus servo can then be started smoothly.

Further, when an optical recording medium including a plurality of signal layers is used, the optical gain for the tilt servo changes depending on the distance from the surface of the signal layer to be focused, although this is not directly associated with the status A. Thus, this method can stabilize the tilt servo by changing the electric circuit gain of the tilt servo circuit in a manner to cancel the change in the optical gain for the tilt servo. The optical gain for the tilt servo is larger as the signal layer arranged at a deeper level is to be focused. It is thus preferable to decrease the circuit gain more as the signal layer arranged at a deeper level is to be focused.

This completes the detailed description of the optical recording/reproduction method and the optical recording/reproduction device according to the present embodiment.

Advantageous Effects of the First Embodiment

The optical recording/reproduction method and the optical recording/reproduction device of the present embodiment prevent the SIL and the optical recording medium from colliding with each other when the tilt servo is started while allowing the device to have a simplified structure without using a plurality of light sources. Also, the optical recording/reproduction method and the optical recording/reproduction device of the present embodiment shorten the time taken to access information stored in an optical recording medium that includes a plurality of signal layers.

Second Embodiment

Optical Recording Medium

An optical recording medium according to a second embodiment of the present invention will now be described.

The optical recording/reproduction method and the optical recording/reproduction device according to the first embodiment are highly effective for optical recording media in general on which recording and/or reproduction can be performed using an SIL optical system. The optical recording medium of the present embodiment has at least two characteristics described below. Such an optical recording medium of the present embodiment is more preferably used with the optical recording/reproduction method of the first embodiment and used by the optical recording/reproduction device of the first embodiment.

As the first characteristic, the optical recording medium includes at least one signal layer arranged at a distance substantially corresponding to the offset amount A of the preferable focal point in the status A from the light emitting surface on the optical recording/reproduction side. In this case, the tilt servo can be started in a stable manner while the offset amount A of the focal point is set at the depth level of this signal layer in the status A of the method according to the present embodiment. Further, the focal point can be set substantially at the same depth level as the signal layer simply by changing the gap to the predetermined gap set for the recording/reproduction status. As a result, the focus servo can be started smoothly.

The depth level at which the signal layer is to be arranged will now be described. As described above, the advantageous effects of the recording/reproduction method and the recording/reproduction device according to the present embodiment depend largely on the range of the diameter Do. The offset amount A of the resulting focal point changes depending on the aperture stop angle $\alpha$ of the objective lens. Considering the difficulties in manufacturing and the feasibility of the recording densities, the aperture stop angle $\alpha$ is realistically designed to be within a range of 50 to 75 degrees.

FIG. 8 shows the relationship between the diameter Do of the light emitting surface and the offset amount A of the focal point calculated for the aperture stop angle $\alpha$ of 50 degrees, 60 degrees, and 75 degrees. The results shown in this table reveal that the offset amount A is preferably in a range of 0.9 to 38 µm inclusive, and is more preferably in a range of 3.3 to 21 µm inclusive to increase the advantageous effects of the recording/reproduction method and the recording/reproduction device according to the first embodiment.

Based on the above findings, the optical recording medium of the present embodiment has at least one signal layer at a distance within a range of 0.9 to 38 µm inclusive, or more preferably at a distance within a range of 3.3 to 21 µm inclusive from the light emitting surface. This structure enables the focus servo to be started smoothly, and shortens the time taken to access information stored in the optical recording medium. The signal layer may be at a position slightly deviating from the above-specified range. The signal layer at a position deviating from the above-specified range will not completely eliminate the advantageous effects of the present embodiment.

As the second characteristic, the optical recording medium of the present embodiment includes a pull-in area that extends over the entire circumference in a manner to have a width of 20 µm or more in the radius direction. The surface gradient $\theta$ satisfies $\theta<\arcsin(\lambda/D)$. This significantly reduces the probability of the collision between the SIL and the optical recording medium when the SIL is moved toward the optical recording medium in the status A until the gap between them becomes $\lambda/2$. The pull-in area extending over the entire circumference in a manner to have a width of 20 µm or more in the radius direction can be easily accessed by the optical recording/reproduction device, without causing the optical recording/reproduction device to access information stored in the optical recording medium. It is more preferable that the pull-in area be formed to satisfy $\theta<\arcsin(\lambda/2D)$. This significantly reduces the probability of the collusion between the SIL and the optical recording medium even when the SIL is moved toward the optical recording medium until the gap between them becomes $\lambda/4$.

The pull-in area refers to an area in which pulling in for focusing on the optical recording medium is performed. In the present embodiment, the pull-in area may be, for example, a management area storing management information that is initially accessed by the recording/reproduction device.

The optical recording medium of the present embodiment having the above characteristics may further have characteristics described below so that the optical recording medium produces additional advantageous effects.

The optical recording medium of the present embodiment may include an identification area for storing an identifier identifying a signal layer at a position deeper than the pull-in area of the signal layer. In this case, the signal layer can be identified when the focal point is at or around the signal layer.

Figure 9A:
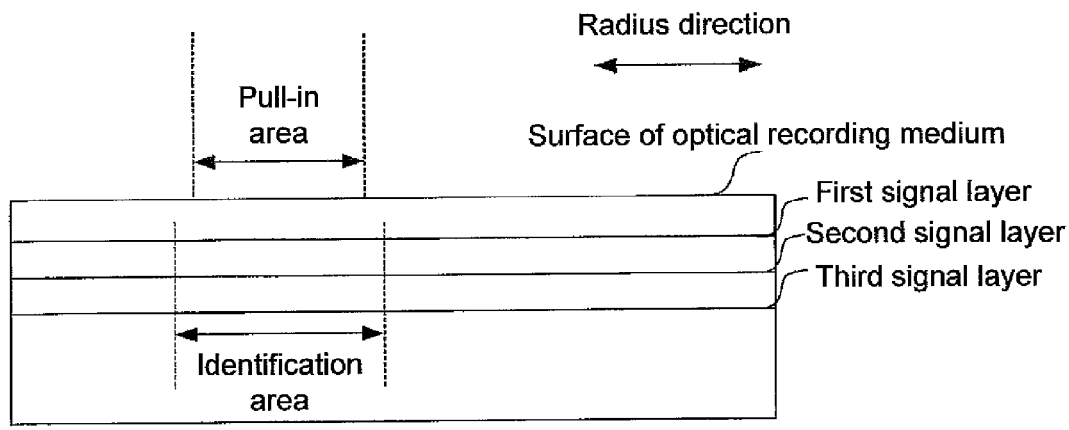
FIGS. 9A and 9B show examples of the structure of an optical recording medium according to a second embodiment of the present invention.
Figure 9B:
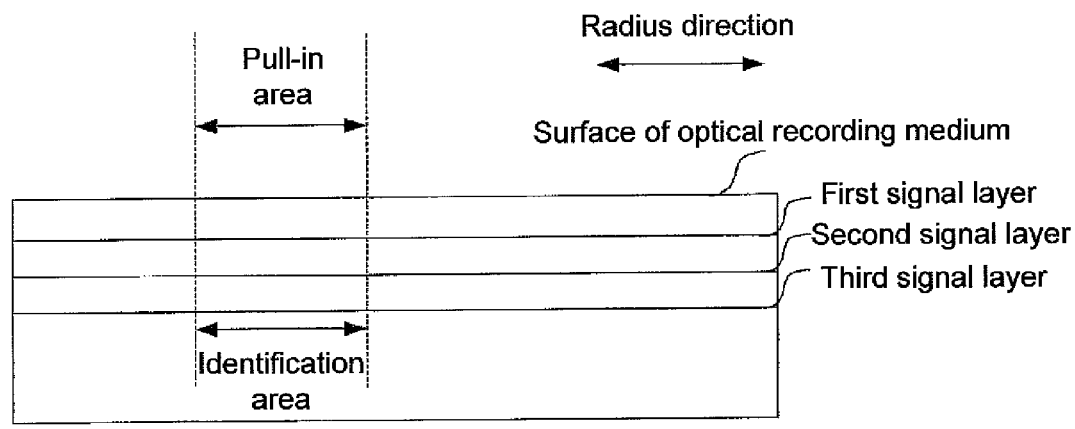

FIGS. 9A and 9B are cross-sectional views of the optical recording medium of the present embodiment illustrating examples of the positional relationship between the pull-in area and the identification area. The identification area is formed either to have substantially the same width as the pull-in area or to have a larger width than the pull-in area in the radius direction of the optical recording medium. In this case, information stored in the identification area can be read in a reliable manner when pulling in for focusing is performed in the pull-in area.

It is preferable that the identifier be recorded in the form of a pit sequence, a wobbling groove or the like. It is also preferable that the S/N ratio of reproduction signals for the identifier be set larger than the S/N ratio of reproduction signals for main data so that the reproduction signals for the identifier can be read even while the focus servo is not being performed. For example, the basic cycle of the pit sequence or of the wobbling groove representing the identifier may be set at least 10 times the shortest pit or the shortest mark of pits and marks that are used to record the main data. The identifier recorded in this manner can be read relatively easily.

The main data refers to information usable by the user, which occupies most part of the storage capacity of the optical recording medium.

Each of all the signal layers may not necessarily include an identification area, but only the signal layer arranged at the deepest level may include an identification area. In this case, for example, the focus offset may be set to increase no further when the identifier in the identification area of the signal layer arranged at the deepest level is read.

The optical recording medium of the present embodiment may include a management area arranged at a position deeper than the position of the pull-in area formed in the signal layer.

The management area refers to an area storing management information, such as information indicating recommended methods for use and the arrangement of data. In this case, the management information can be accessed smoothly while no movement or only a minimum movement is required in the radial direction after the focus servo is started in the pull-in area. The positional relationship between the pull-in area and the management area in the radial direction may be the same as the positional relationship between the pull-in area and the identification area. Each of all the layers may not necessarily include a management area.

It is preferable that the management area be formed in the signal layer that is focused initially. This is due to the following reasons. When the management area is formed in the signal layer arranged at the deepest level, the time taken to access the management information can be shortened easily while the offset amount of the focal point is large in the status A. When the management area is formed in the signal layer arranged at the shallowest level, the number of S-shapes of focus signals to be counted is minimized before the focusing is achieved. This will reduce erroneous counts.

An example of a method for manufacturing the optical recording medium according to the present embodiment will now be described.

Figure 10A:
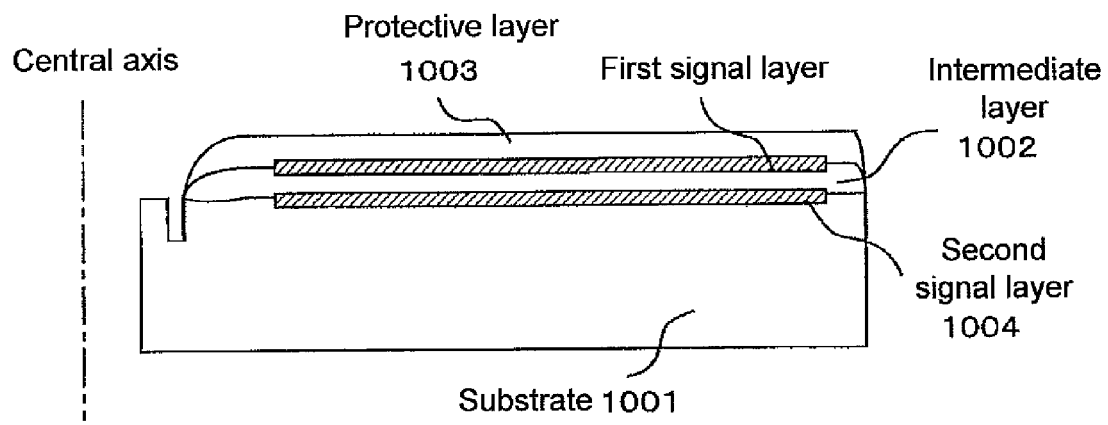
FIGS. 10A and 10B show an example of the structure of an optical recording medium according to the second embodiment.
Figure 10B:
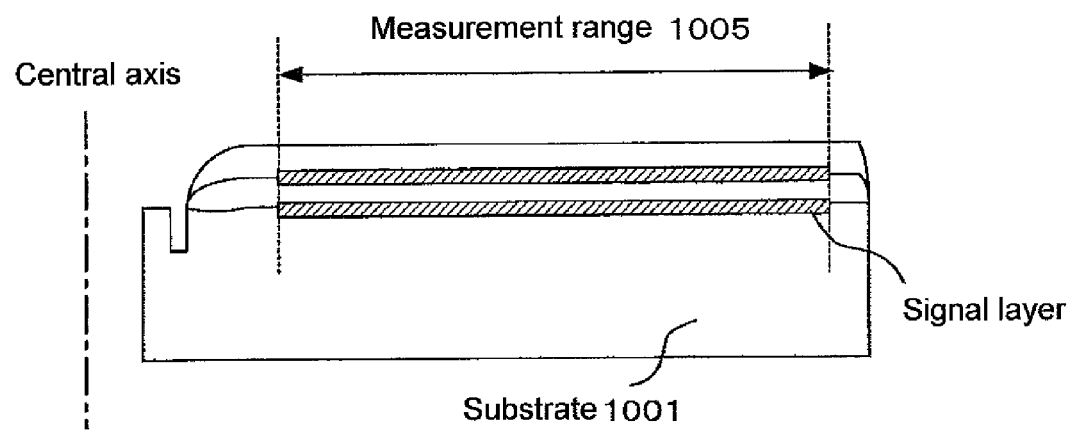

FIGS. 10A and 10B show an example of the optical information recording medium of the present embodiment, which has a disc shape and has a central hole. A substrate 1001 may be formed from various materials that can form a flat plane, such as various glass materials, metals, silicon, polycarbonate, olefin, and polymethylmethacrylate (PMMA). It is more preferable that the substrate 1001 be formed to have a refractive index that differs as greatly as possible from the refractive index of an intermediate layer 1002 and of a protective layer 1003. The reasons for this will be described below.

An optical recording medium for an SIL can easily increase the recording density when the protective layer and the intermediate layer have a high refractive index. To increase the difference in refractive index between the substrate and the protective layer and between the substrate and the intermediate layer, it is preferable to form the substrate of the optical recording medium using a material having a relatively low refractive index. To decrease the manufacturing cost, it is preferable to form the substrate of the optical recording medium using a plastic material.

Considering these, it is particularly preferable to form the substrate 1001 using polycarbonate, olefin, or PMMA. A concave-convex pattern is formed on the substrate 1001 by injection molding or thermal transfer, and a recording material of at least one layer is applied on the pattern by, for example, sputtering, vapor deposition, or spin coating to form a second signal layer 1004. To manufacture a read-only optical recording medium, only a reflective material is to be applied instead of the recording material.

A method for forming the intermediate layer 1002 will now be described.

A liquid resin for forming an intermediate layer is first applied by, for example, spin coating, screen printing, or ink jet printing. For an optical recording medium for an SIL, the NA of an objective lens is much larger than the NA of an objective lens used for conventional optical recording media including a DVD and a Blu-ray disc. Also, the focal depth of the objective lens is shallower, and a gap of small as substantially several tens nanometers, which is a fraction of several tens of thousands of the gap required for conventional optical recording media, needs to be maintained in a stable manner. Thus, an intermediate layer and a protective layer (described later) need to have a highly precise thickness. The thickness precision of these layers is not easily achieved when a liquid resin is applied to form these layers. In particular, a large thickness variation over the entire circumference at the same radius will easily disable recording and reproduction to be performed in a stable manner. To reduce the thickness variation over the entire circumference, spin coating is most preferable among the above listed methods for applying a liquid resin.

However, spin coating will have another problem described below when the applied film thickness is 10 µm or less.

Figure 11A:
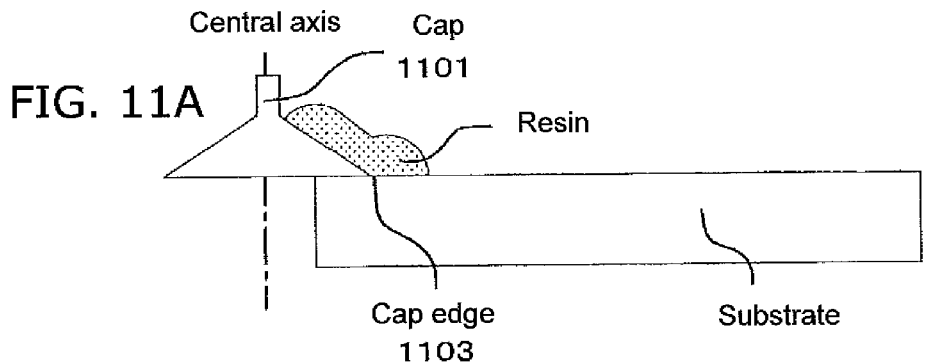
FIGS. 11A to 11C show a conventional method for applying resin to form an intermediate layer of an optical recording medium and problems associated with the conventional method.
Figure 11B:
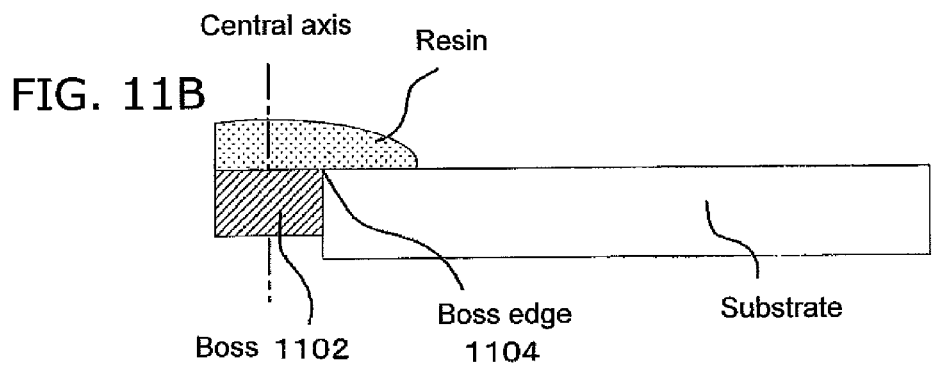

In spin coating, the resin is spread using centrifugal force. A film applied through spin coating tends to have a smaller thickness at its inner circumferential portion. In particular, when spin coating is used to apply the material onto a structure having a central hole like an optical disc, the material will not be applied to the central area unless some measures are taken. In this case, the above tendency increases. It is thus extremely difficult to achieve a required thickness distribution of the applied film. To solve this problem, a cap 1101 shown in FIG. 11A or a boss 1102 shown in FIG. 11B may be used to close the central hole. Using the cap or the boss, the resin may be dripped more at a position near the central axis of the optical disc. Such methods have been proposed and have now been commercialized.

Figure 11C:
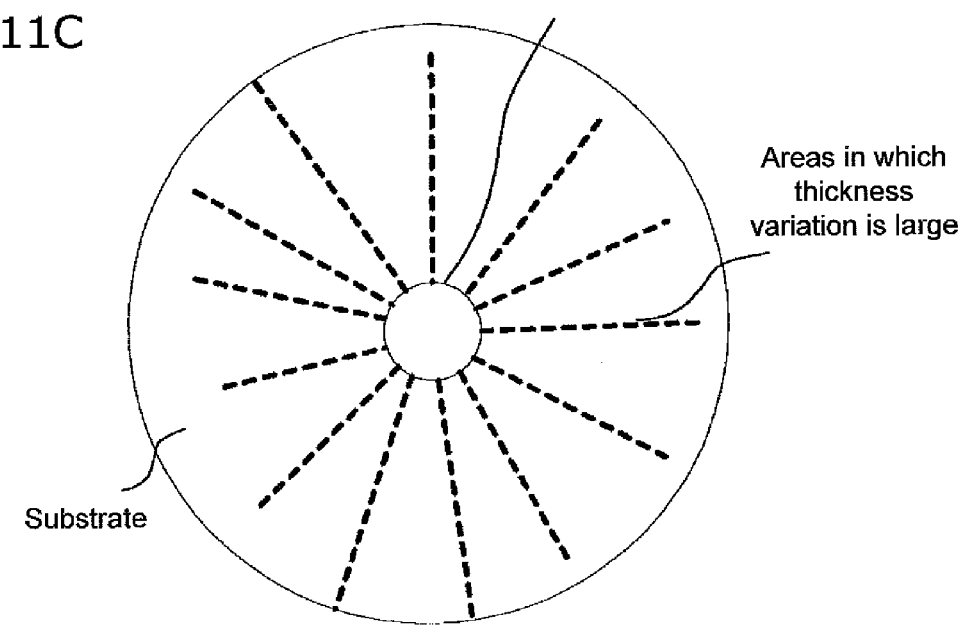

However, when the applied thickness is to be 10 µm or less, or in particular 5 µm or less, the flow of the applied resin can be disturbed significantly by any small bump formed at an edge 1103 of the cap or at an edge 1104 of the boss. This can cause a large thickness variation to occur radially from the cap edge 1103 or from the boss edge 1104 as shown in FIG. 11C. To solve this problem, the optical recording medium of the present embodiment is formed using the method described below.

Figure 12A:
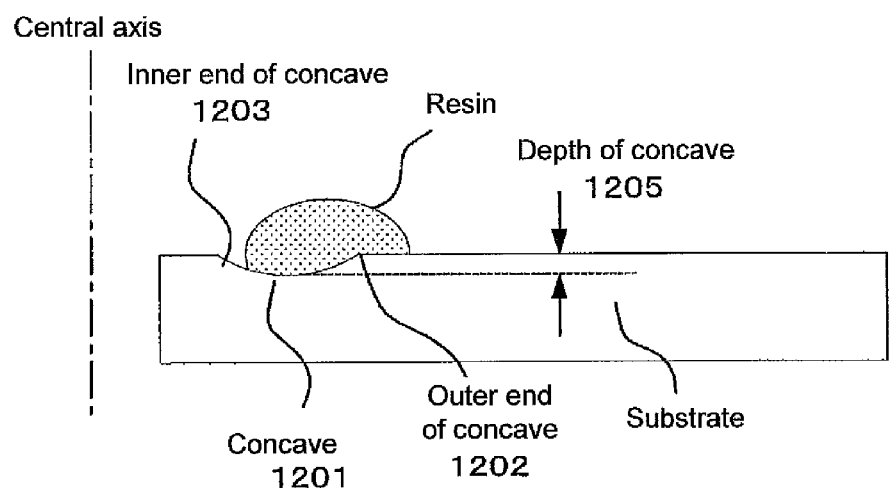
FIGS. 12A to 12B show an example of a method for manufacturing an optical recording medium according to the second embodiment.

As shown in FIG. 12A, a shallow concave 1201 is formed to extend in a doughnut-like shape in an inner circumferential portion of the substrate so that resin can be stored in the concave 1201. This structure uses neither a cap nor a boss but reduces the likelihood that the applied film will have a smaller thickness in its inner circumferential portion. The concave is highly effective when its depth 1205 is 30 times a desired applied thickness or more. The concave is also required to have a continuously changing slope across the entire area in which the applied resin drips before the resin is spread by spin coating. Any discontinuously changing slope portion of the concave will cause a radial thickness variation to occur, like a radial thickness variation occurring with the cap edge or the boss edge described above. At least an outer end 1202 of the concave is required to have a continuously changing slope. An inner portion of the concave or an inner end 1203 of the concave, which will not be covered by the resin, may have a discontinuously changing slope. This method enables the applied film thickness to be more uniform than conventional methods.

Figure 12B:
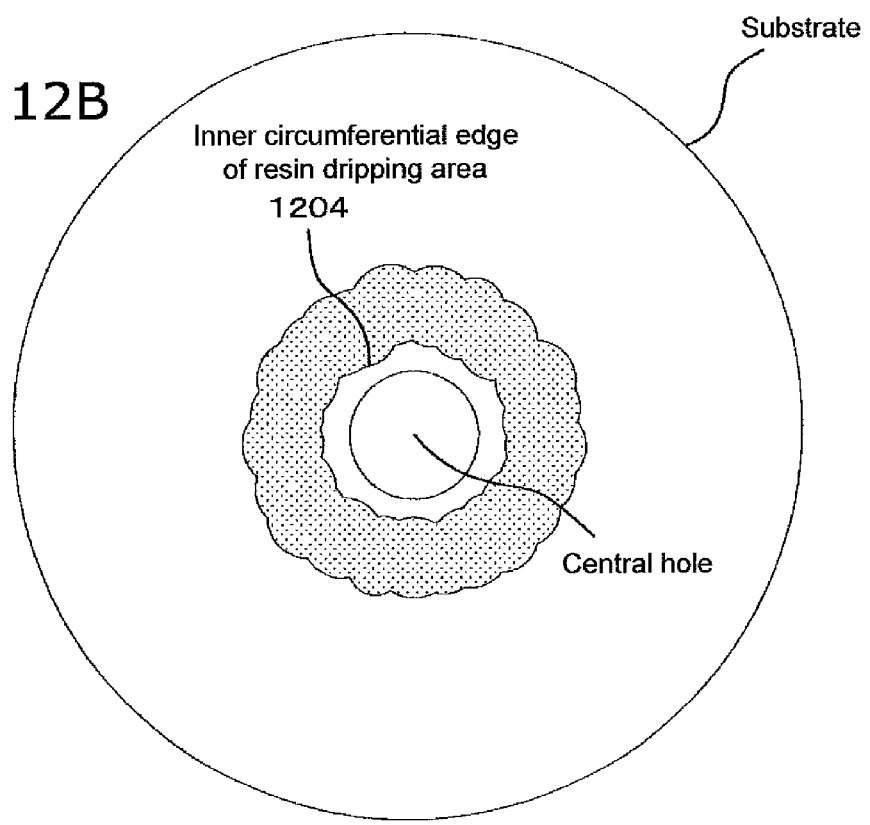

However, although this method reduces the thickness variation in the radial direction, the method may fail to reduce the thickness variation in the circumferential direction. The film applied with this method may have a thickness variation exceeding 100 nm in the circumferential direction. Although this is not a problem for an optical recording medium using a conventional far-field optical system such as a Blu-ray disc, the thickness variation in the circumferential direction can constitute a significant problem for an optical recording system for an SIL. Further investigation on the thickness variation over the entire circumference has revealed that the thickness variation depends significantly on the shape of an inner circumferential edge 1204 of a resin dripping area shown in FIG. 12B.

Figure 13A:
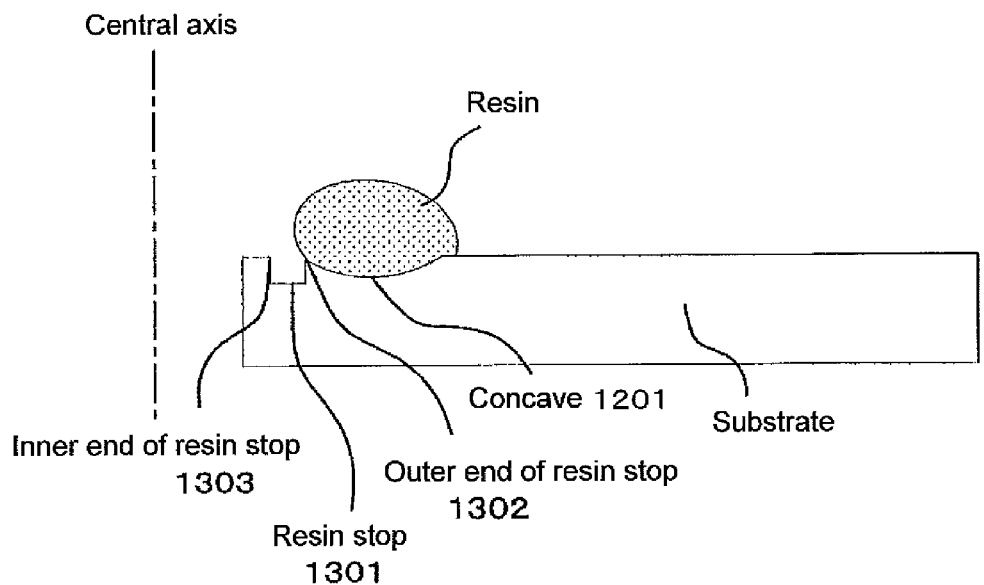
FIGS. 13A and 13B show another example of the optical recording medium manufacturing method according to the second embodiment.
Figure 13B:
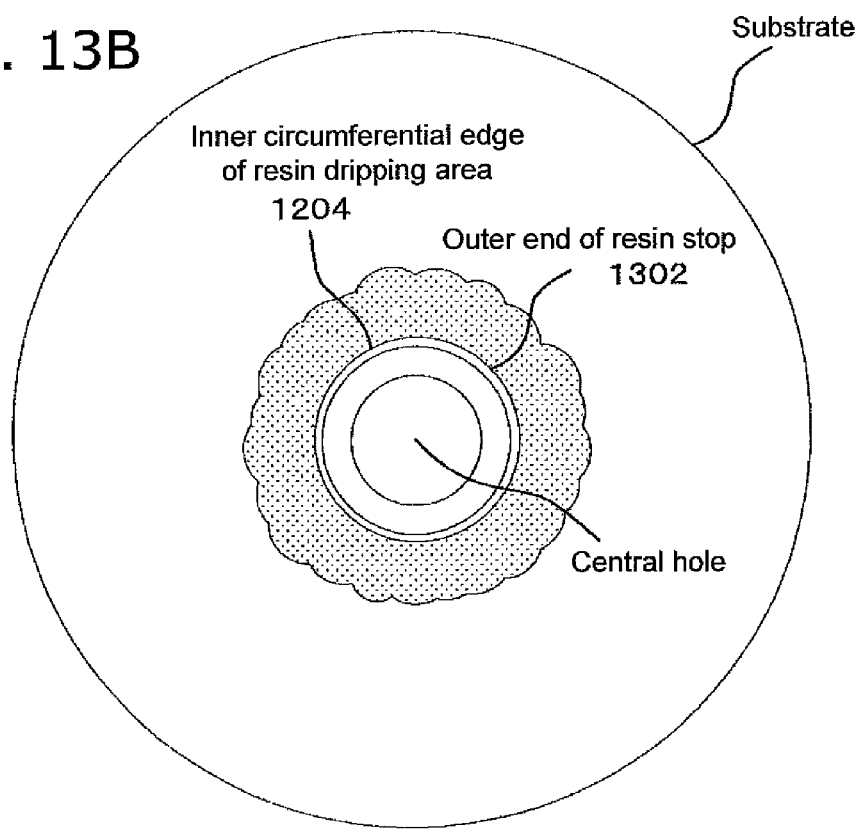
Figure 14A:
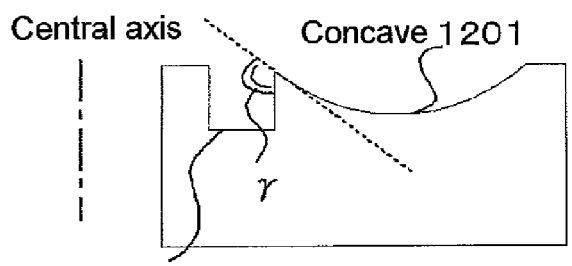
FIGS. 14A to 14F show examples of the shape of a concave formed during the manufacturing processes for the optical recording medium according to the second embodiment.

As shown in FIG. 13A, resin is applied on a substrate on which a concentric resin stop 1301 is arranged at a position nearer the center than the concave 1201. As shown in FIG. 13B, the inner circumferential edge of the resin dripping area is arranged concentrically with an outer end 1302 of the resin stop. In this case, the thickness variation over the entire circumference is reduced dramatically to 20 nm or less even when the resin is applied to have an average thickness of 3.0 µm. As shown in FIG. 13A, the resin may be dripped in a manner to swell from the outer end of the resin stop to the inner circumferential side. This reduces the thickness variation in the radial direction, and decreases the tendency that the applied film will have a smaller thickness in its inner circumferential portion. The resin stop is only required to be arranged nearer the center than the concave and be formed by a discontinuously changing slope. Also, as shown in FIG. 14A, a change γ in the slope extending from the concave to the resin stop is preferably 45 degrees or more, and is more preferably 90 degrees or more. To increase the effect of the swelling portion of the resin toward the inner circumference, the distance between the inner end and the outer end of the resin stop is preferably 50 µm or more, and is more preferably 100 µm or more.

The conditions described above are not the essential requirements.

Figure 14B:
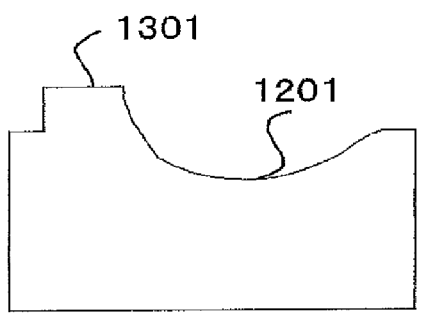
Figure 14C:
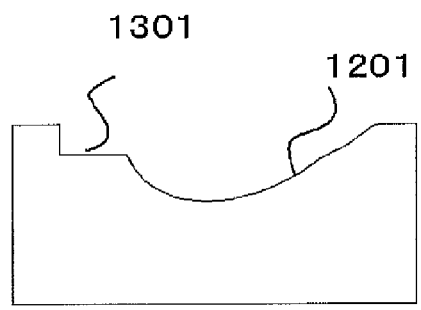
Figure 14D:
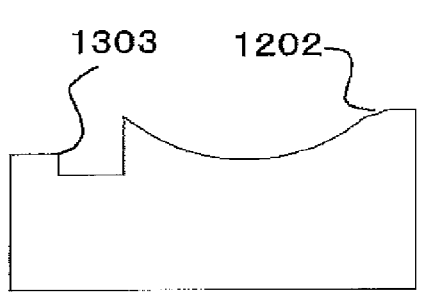
Figure 14E:
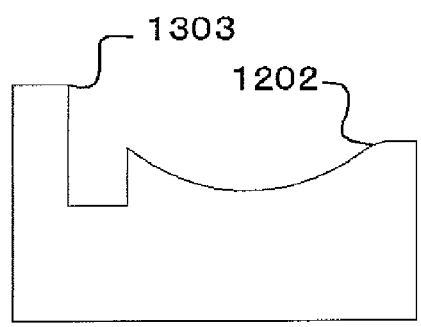
Figure 14F:
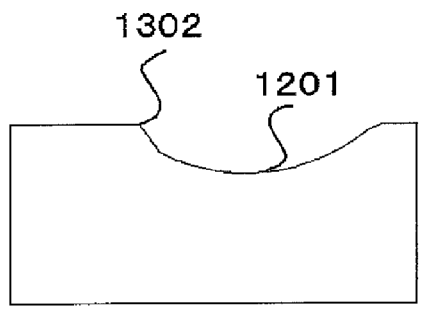

Alternatively, the resin stop used in the present embodiment may be formed by, for example, a convex shown in FIG. 14B or a step shown in FIG. 14C. Further, the resin stop may be formed in a manner that a part of the substrate at the inner circumferential side from the inner end 1303 of the resin stop is at a different level from a part of the substrate at the outer circumferential side from the outer end 1202 of the concave as shown in FIGS. 14D and 14E. Also, as shown in FIG. 14F, the slope forming the concave may be discontinuous at the concave inner end to have the change γ of 45 degrees or more. In this case, the inner end of the concave substantially functions as the resin stop outer end 1302. This modification also produces the advantageous effects of the present embodiment. The resin stop used in the manufacturing processes of the optical recording medium according to the present embodiment should not be limited to those having shapes shown in the figures. The resin stop is only required to have the characteristics described above. Also, the optical information recording medium of the present embodiment is highly effective for spin coating in general that is used to form a light transmissive layer required to have a highly precise thickness uniformity when the applied thickness is 10 µm or less, irrespective of the purpose of the layer, such as an intermediate layer or a protective layer, and the composition of the layer. The concave or the resin stop can produce its unique advantageous effect when used solely.

With the above optical recording medium manufacturing method, resin for forming an intermediate layer is first applied, and then a substrate for transferring a concavo-convex pattern representing pits or grooves is placed on the applied resin for forming an intermediate layer in a vacuum. The structure is then subjected to UV radiation to harden the resin. The substrate for transferring the pattern is detached to complete the intermediate layer 1002. Subsequently, a first signal layer is formed in the same manner as the second signal layer. Resin for forming a protective layer is then applied with the method described above. The structure is then subjected to UV radiation to harden the applied resin for forming a protective layer. This completes the optical recording medium of the present embodiment.

Although the present embodiment describes the case in which the optical recording medium includes two signal layers, the optical recording medium of the present embodiment may include any number of signal layers. An optical recording medium according to the present embodiment including any number of signal layers can be manufactured by partially repeating or skipping the above manufacturing processes.

As described above, an intermediate layer and a protective layer included in an optical recording medium for an SIL optical system are required to have a highly precise thickness uniformity. To satisfy this requirement, the optical recording medium needs to be manufactured using methods that have not been used conventionally when the optical recording medium is formed using a liquid resin. The concave and the resin stop used for the optical recording medium of the present embodiment are good examples of techniques that improve the thickness uniformity of the layers.

In association with this, the reason why it is preferable to increase the difference in refractive index between the substrate and the intermediate layer and between the substrate and the protective layer formed with the optical recording medium manufacturing method of the present embodiment will now be described. Increasing the difference in refractive index between the substrate and the intermediate layer and between the substrate and the protective layer will produce advantages in manufacturing the optical recording medium.

To reduce the thickness variations among individual optical recording media, changes in the film thickness need to be monitored during manufacture and the conditions for applying the material need to be adjusted finely according to the monitoring results. As shown in FIG. 10B, the thickness of the intermediate layer and the thickness of the protective layer are measured using reflection from the recording material or from the reflective material of the signal layers during manufacture of a conventional optical recording medium. Thus, the conventional optical recording medium only allows the thickness measurement to be performed within a measurement range 1005, which extends above the signal layers. The signal layers refer to all areas formed by a recording material or a reflective material, and should not necessarily be areas in which signals are recorded using pits, marks, or grooves, or should not necessarily be recordable areas.

Unlike such a conventional recording medium, the optical recording medium of the present embodiment is formed in a manner that the difference in refractive index between the substrate and the protective layer and between the substrate and the intermediate layer is large to increase the reflectance from the boundary between the substrate and the intermediate layer or between the substrate and the protective layer. This enables the thickness measurement to be possible in areas outside the measurement range 1005, which are affected more easily by factors that can vary during the manufacturing processes. More specifically, the film thickness can be monitored in areas outside the measurement range 1005 to enable a thickness variation that may occur during the manufacturing processes to be detected earlier than in the conventional optical recording medium. This method enables manufacture of the optical recording medium having a more stable quality than conventional methods.

Further, a slight change in the thickness occurring within the measurement range 1005 is normally not detectable as a thickness variation. In the optical recording medium of the present embodiment, however, even a slight change in the thickness that can cause a problem in an actual use of the optical recording medium is detectable as a thickness variation when, for example, the thickness change is caused by factors outside the measurement range 1005.

FIG. 16 shows the reflectance from the boundary between the substrate and the intermediate layer that is arranged on the substrate or from the boundary between the substrate and the protective layer for each varying difference in refractive index between the substrate and the intermediate layer or between the substrate and the protective layer. FIG. 16 shows the reflectance when the refractive index of the substrate is 1.5 and 1.6. The thickness measurement of the optical recording medium can be performed in a sufficiently reliable manner when the reflectance is substantially 1.0%. The values in the figure indicate that the refractive index difference is required to be substantially 0.35 when the refractive index of the substrate is from 1.5 to 1.6.

When the reflectance is substantially 1.5%, various servos and signal readout can be performed using a pickup head. Selecting the materials for the layers of the optical recording medium in a manner to achieve the refractive index difference of substantially 0.45 will also enable a read-only medium, which does not require a recording material and a reflection material to be used for its signal layers, to be manufactured at an extremely low cost.

To achieve the above refractive index difference when light having a wavelength of 400 nm is used for the thickness measurement or for recording/reproduction, the substrate may be formed by, for example, PMMA having a refractive index of 1.5 or polycarbonate having a refractive index of 1.6, and the intermediate layer and the protective layer may be formed by, for example, a material obtained by adding a filler of titania or zirconia to an acrylic ultraviolet curable resin.

An acrylic ultraviolet curable resin having a refractive index of 1.8 or more has been commercialized. A filler of titania or zirconia having a refractive index of 2.3 or more has been commercialized. The amount of filler to be added can be increased up to 70% by weight. This means that the resin having a refractive index of substantially 2.1 can be obtained easily. Combining these materials for the substrate with an acrylic ultraviolet curable resin will increase the difference in refractive index between the substrate and the intermediate layer or between the substrate and the protective layer up to substantially 0.6.

The optical recording medium of the present embodiment is only required to achieve the refractive index difference describe above. The optical recording medium may be manufactured using materials other than the above specified materials. The optical recording medium can have advantageous effects in accordance with the difference in refractive index between the materials used.

This completes the description of the method for manufacturing the optical recording medium according to the present embodiment.

Finally, the arrangement of the pull-in area in the optical recording medium of the present embodiment will be described based on the surface gradient of optical recording media obtained through trial manufacture according to the present embodiment.

Figure 15:
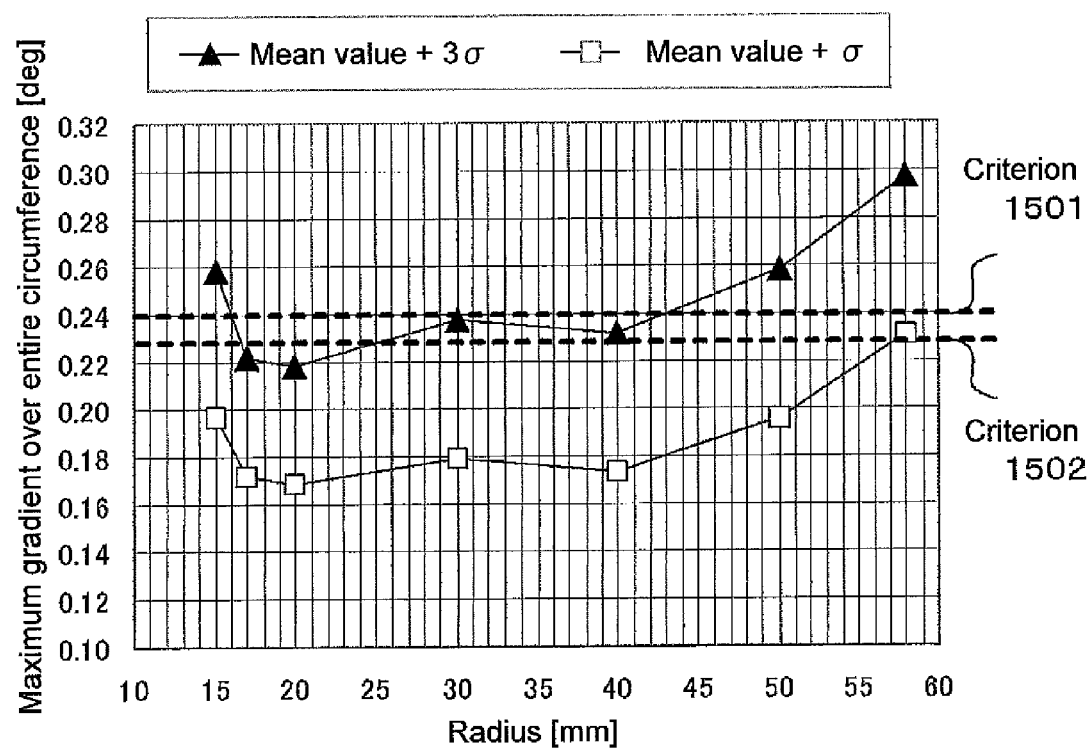
FIG. 15 shows the surface gradient of the optical recording medium according to the second embodiment.

FIG. 15 shows the maximum surface gradient of an optical recording medium over the entire circumference obtained using ten optical recording media manufactured with the method of the present embodiment. The ten optical recording media each include two signal layers. The two graphs in the figure indicate values obtained by adding a standard deviation σ to the mean value of the ten optical recording media, and values obtained by adding 3σ to the mean value of the ten optical recording media. Statistically, 68% of the total production would have the values obtained by adding the standard deviation σ to the mean value of the ten optical recording media. Although the values calculated using the ten trial optical recording media may be statistically insufficient to be based on, the values obtained by adding the standard deviation σ to the mean value of the ten optical recording media can serve as a reference in determining the feasibility of manufacturing the optical recording medium.

The two findings described below are obtained from FIG. 15.

First, the value obtained by adding the standard deviation σ to the mean value of the ten optical recording media is 0.2 degree or less within a wide radius range of 15 to 50 mm. As described above, the gradient of 0.2 degree is a sufficient condition for a recording medium preferable for use with the optical recording/reproduction method of the present embodiment. This value indicates the feasibility of manufacturing an optical recording medium used with the optical recording/reproduction method of the present embodiment.

Second, the radius at which the pull-in area is to be arranged can be selected based on the fact that the maximum surface gradient over the entire circumference depends on the radius. It is preferable that the pull-in area be arranged at a radius on which the maximum surface gradient over the entire circumference is smaller. When a radius on which the surface gradient is relatively smaller is determined using the value obtained by adding 3 σ to the mean value of the ten recording media, with which a difference in the radius direction is easily observable, the following is understood. The radius at which the pull-in area is to be arranged is preferably within a range of 16 to 43 mm inclusive, which is below or equal to a criterion 1501, or is more preferably within a range of 17 to 25 mm inclusive, which is below or equal to a criterion 1502. The criteria used in this example have no special meanings, and are simply used to select the radius ranges in which the maximum surface gradient over the entire circumference is relatively small. In the present embodiment, the pull-in area may not necessarily be arranged on the radius positions specified above. To have the advantageous effects of the present embodiment, the pull-in area is only required to be arranged at positions at which the surface gradient is less than 0.2 degree.

Advantageous Effects of the Second Embodiment

The optical recording medium of the present embodiment prevents the SIL and the optical recording medium from colliding with each other when the tilt servo is started. When combined with the optical recording/reproduction method and the optical recording/reproduction device of the first embodiment, the optical recording medium of the present embodiment prevents the SIL and the optical recording medium from colliding with each other in a more reliable manner.

The optical recording/reproduction method, the optical recording/reproduction device, the program, and the optical recording medium of the present invention are useful for optical recording and/or reproduction performed using an SIL optical system, and are also useful when applied to or used as an optical recording medium for such optical recording and/or reproduction.

The invention claimed is:

1. An optical recording/reproduction method of operating a gap servo that controls a gap between a surface of an optical recording medium and a bottom surface of a solid immersion lens (SIL) using reflected light that is generated from light traveling from the bottom surface of the SIL and reflecting on the optical recording medium, a focus servo that controls a distance between a focal point of the light and the bottom surface of the SIL, and a tilt servo that controls a tilt of the bottom surface of the SIL relative to the surface of the optical recording medium using the reflected light, said method comprising:
    starting the gap servo with the gap being within a range of near field and being set larger than a gap set when at least one of optical recording and reproduction is performed, and shifting the focal point to an optical recording medium side from the bottom surface of the SIL;
    starting the tilt servo during said starting the gap servo; and
    after said starting the tilt servo, setting the gap smaller than the gap set in said starting the gap servo and arranging the SIL at a position for the at least one of optical recording and reproduction.

2. The optical recording/reproduction method according to claim 1, wherein
    in said starting the gap servo, the focal point is shifted to a position near a signal layer of the optical recording medium, the signal layer being most distant from the bottom surface of the SIL among one or more signal layers of the optical recording medium on which the focal point is to be formed.

3. The optical recording/reproduction method according to claim 1, wherein
    in said starting the gap servo, the focal point is shifted to a position near a signal layer of the optical recording medium, the signal layer being nearest to the bottom surface of the SIL among one or more signal layers of the optical recording medium on which the focal point is to be formed.

4. The optical recording/reproduction method according to claim 2, wherein
    the focal point is shifted in accordance with an initial condition of the focus servo.

5. The optical recording/reproduction method according to claim 1, wherein
    the optical recording medium includes a plurality of signal layers on which the focal point is to be formed from one side of the optical recording medium, and
    a circuit gain of the tilt servo is reduced more as a distance between the bottom surface of the SIL and each of the signal layers of the optical recording medium is larger.

6. The optical recording/reproduction method according to claim 1, wherein
    in said starting the gap servo, a position of the bottom surface of the SIL is detected using the focus servo.

7. The optical recording/reproduction method according to claim 1, wherein
    in said starting the tilt servo, a diameter of a light emitting surface of the SIL is adjusted to fall within a range of 7 to 90 μm inclusive.

8. The optical recording/reproduction method according to claim 1, wherein
    in said starting the tilt servo, a diameter of a light emitting surface of the SIL is adjusted to fall within a range of 25 to 50 μm inclusive.

9. An optical recording/reproduction device comprising:
    a gap servo mechanism configured to control a gap between a surface of an optical recording medium and a bottom surface of solid immersion lens (SIL) using reflected light that is generated from light traveling from the bottom surface of the SIL and reflecting on the optical recording medium, a focus servo mechanism arranged to control a distance between a focal point of the light and the bottom surface of the SIL, and a tilt servo mechanism arranged to control a tilt of the bottom surface of the SIL relative to the surface of the optical recording medium using the reflected light, wherein the device is configured to
    start a gap servo with the gap being within a range of near field and being set larger than a gap set when at least one of optical recording and reproduction is performed, and shift the focal point to an optical recording medium side from the bottom surface of the SIL,
    start the tilt servo when starting the gap servo, and
    after starting the tilt servo, set the gap smaller than the gap set when starting the gap servo and arrange the SIL at a position for the optical recording and/or reproduction.

10. A non-transitory computer-readable storage medium that stores a program enabling a computer to implement a gap servo that controls a gap between a surface of an optical recording medium and a bottom surface of a solid immersion lens (SIL) using reflected light that is generated from light traveling from the bottom surface of the SIL and reflecting on the optical recording medium, a focus servo that controls a distance between a focal point of the light and the bottom surface of the SIL, and a tilt servo that controls a tilt of the bottom surface of the SIL relative to the surface of the optical recording medium using the reflected light, the program enabling the computer to implement:
    starting the gap servo with the gap being within a range of near field and being set larger than a gap set when at least one of optical recording and reproduction is performed, and shifting the focal point to an optical recording medium side from the bottom surface of the SIL;
    starting the tilt servo during starting the gap servo; and
    after starting the tilt, setting the gap smaller than the gap set in starting the gap servo and arranging the SIL at a position for the optical recording and/or reproduction.

11. An optical recording medium on which at least one of optical recording and reproduction is performed using a solid immersion lens (SIL) optical system, the optical recording medium comprising:

a substrate;

a protective layer; and at least one signal layer disposed between the substrate and the protective layer, wherein said at least one signal layer has a distance from a bottom surface of the SIL falling within a range of 0.9 to 38 μm inclusive, the signal layer includes a pull-in area, a surface gradient θ of the optical recording medium at the pull-in area satisfies θ<arcsin (λ/D), where λ is a wavelength of light traveling from the SIL, and D is a diameter of the bottom surface of the SIL or a longest shaft diameter of the SIL, and the pull-in area has a width of 20 μm or more in a radius direction, extending over an entire circumference of the signal layer.

12. The optical recording medium according to claim 11, wherein the signal layer has a distance from the bottom surface of the SIL falling within a range of 3.3 to 21 μm inclusive.

13. The optical recording medium according to claim 11, wherein the surface gradient θ satisfies θ<arcsin (λ/2D).

14. The optical recording medium according to claim 11, wherein the pull-in area is arranged at a position corresponding to a radius falling within a range of 16 to 43 mm inclusive.

15. The optical recording medium according to claim 11, wherein the pull-in area is arranged at a position corresponding to a radius falling within a range of 17 to 25 mm inclusive.

16. The optical recording medium according to claim 11, wherein a difference between a refractive index of the substrate and a refractive index of the protective layer is 0.35 or more.

17. The optical recording medium according to claim 11, further comprising:

a plurality of signal layers including the at least one signal layer; and an intermediate layer formed between the plurality of signal layers, wherein a difference between a refractive index of the substrate and a refractive index of the intermediate layer is 0.35 or more.

18. The optical recording medium according to claim 16, wherein the refractive index difference is 0.45 or more.

19. The optical recording/reproduction method according to claim 1, wherein in starting the gap servo, the gap is within a range of approximately λ/4 to λ/2 inclusive, where λ is a wavelength of the light traveling from the SIL.

* * * * *